United States Patent
Witych

(10) Patent No.: US 9,398,414 B2
(45) Date of Patent: Jul. 19, 2016

(54) METHOD AND DEVICES FOR DETERMINING THE POSITION OF A MOBILE COMMUNICATION DEVICE

(71) Applicant: Deutsche Telekom AG, Bonn (DE)

(72) Inventor: Michael Witych, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 255 days.

(21) Appl. No.: 14/271,479

(22) Filed: May 7, 2014

(65) Prior Publication Data

US 2014/0335889 A1    Nov. 13, 2014

(30) Foreign Application Priority Data

May 7, 2013   (DE) .......................... 10 2013 104 727

(51) Int. Cl.
*H04W 4/02* (2009.01)
*H04W 64/00* (2009.01)
*G01S 5/02* (2010.01)
*G01S 5/10* (2006.01)

(52) U.S. Cl.
CPC ............. *H04W 4/023* (2013.01); *G01S 5/0289* (2013.01); *G01S 5/10* (2013.01); *H04W 64/00* (2013.01); *H04W 64/006* (2013.01)

(58) Field of Classification Search
None
See application file for complete search history.

(56) References Cited

U.S. PATENT DOCUMENTS

| | | | |
|---|---|---|---|
| 2006/0270349 A1 | 11/2006 | Overy et al. | |
| 2009/0042584 A1* | 2/2009 | Nagata | G01S 19/42 455/456.1 |
| 2009/0131075 A1* | 5/2009 | Mazlum | G01S 5/0205 455/456.1 |
| 2012/0052884 A1* | 3/2012 | Bogatin | G01S 5/0284 455/456.6 |
| 2012/0184287 A1 | 7/2012 | Jovicic et al. | |
| 2012/0295637 A1* | 11/2012 | Hannuksela | G01S 3/8034 455/456.1 |
| 2013/0137448 A1* | 5/2013 | Shen | G01S 1/08 455/456.1 |

FOREIGN PATENT DOCUMENTS

| | | |
|---|---|---|
| DE | 60110052 T2 | 5/2006 |
| EP | 1617601 A2 | 1/2006 |
| WO | WO 2009120146 A1 | 10/2009 |
| WO | WO 2010129589 A1 | 11/2010 |

* cited by examiner

*Primary Examiner* — Olumide T Ajibade Akonai
*Assistant Examiner* — Margaret G Mastrodonato
(74) *Attorney, Agent, or Firm* — Leydig, Voit & Mayer, Ltd

(57) ABSTRACT

A method for determining the position of a mobile communications device of a wireless communication network includes determining observational values, providing position information, and executing an optimization algorithm with respect to multiple mobile communications devices. The communications devices define a temporary geometric position network.

22 Claims, 7 Drawing Sheets

METHOD AND DEVICES FOR DETERMINING THE POSITION OF A MOBILE COMMUNICATION DEVICE

CROSS-REFERENCE TO RELATED APPLICATIONS

Priority is claimed to German Patent Application No. DE 10 2013 104 727.0, filed on May 7, 2013, the entire disclosure of which is hereby incorporated by reference herein.

FIELD

The invention relates to a method for determining the position of at least one mobile communications device of a wireless communication network, to a mobile communications device for use in a wireless communication network, to a central wireless communications device for determining the position of at least one mobile communications device, and to a computer program.

BACKGROUND

Mobile telephones available in the market, especially so-called smartphones, are capable of performing positioning of the smartphone and for this purpose include a GPS receiver, inter alia. By using a GPS receiver, the position of the smartphone can be calculated and can optionally be displayed on a display. In order to improve positioning using the GPS receiver, a Differential Global Positioning System (DGPS) can be used, which includes at least one stationary GPS receiver. The stationary GPS receivers allow to determine correction signals for the GPS receiver of the smartphone, and for this purpose data are transferred to the smartphone.

From DE 601 10 052 T2 a system for wireless data transmission is known which can be used for estimating the position of a device. For this purpose, at least one slave transmits its position to a master which can estimate the distance between the slave of known position and itself. The master then uses the current position of the slave and the information about the estimated distance between the slave and the master in order to estimate its current position. The estimation can be performed using fuzzy logic.

U.S. 2012/0184287 A1 discloses a method for operating a first, mobile communications device to determine the position of the first, mobile communications device. The position is determined based on a positional history of a second mobile communications device and a measured signal.

SUMMARY

A method for determining the position of a mobile communications device of a wireless communication network. The method includes the steps of: a1) determining, by a processor, an observational value which defines the positional relationship between a first mobile communications device and a second communications device; a2) determining, by the processor, a further observational value which defines the positional relationship between the first mobile communications device and a further communications device; b) providing a position information for the second communications device which defines the position of the second communications device which includes information on position coordinates and the accuracy thereof, and providing a position information for the further communications device which defines the position of the further communications device and which includes information on position coordinates and the accuracy thereof; c) and executing, by the processor, an optimization algorithm for estimating the position coordinates of the first mobile communications device and the accuracy of the position coordinates based on the observational value, the further observational value, the position information of the second communications device, and the position information of the further communications device. The optimization algorithm is based on a network adjustment. The first, second, and further mobile communications devices define a temporary geometric position network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
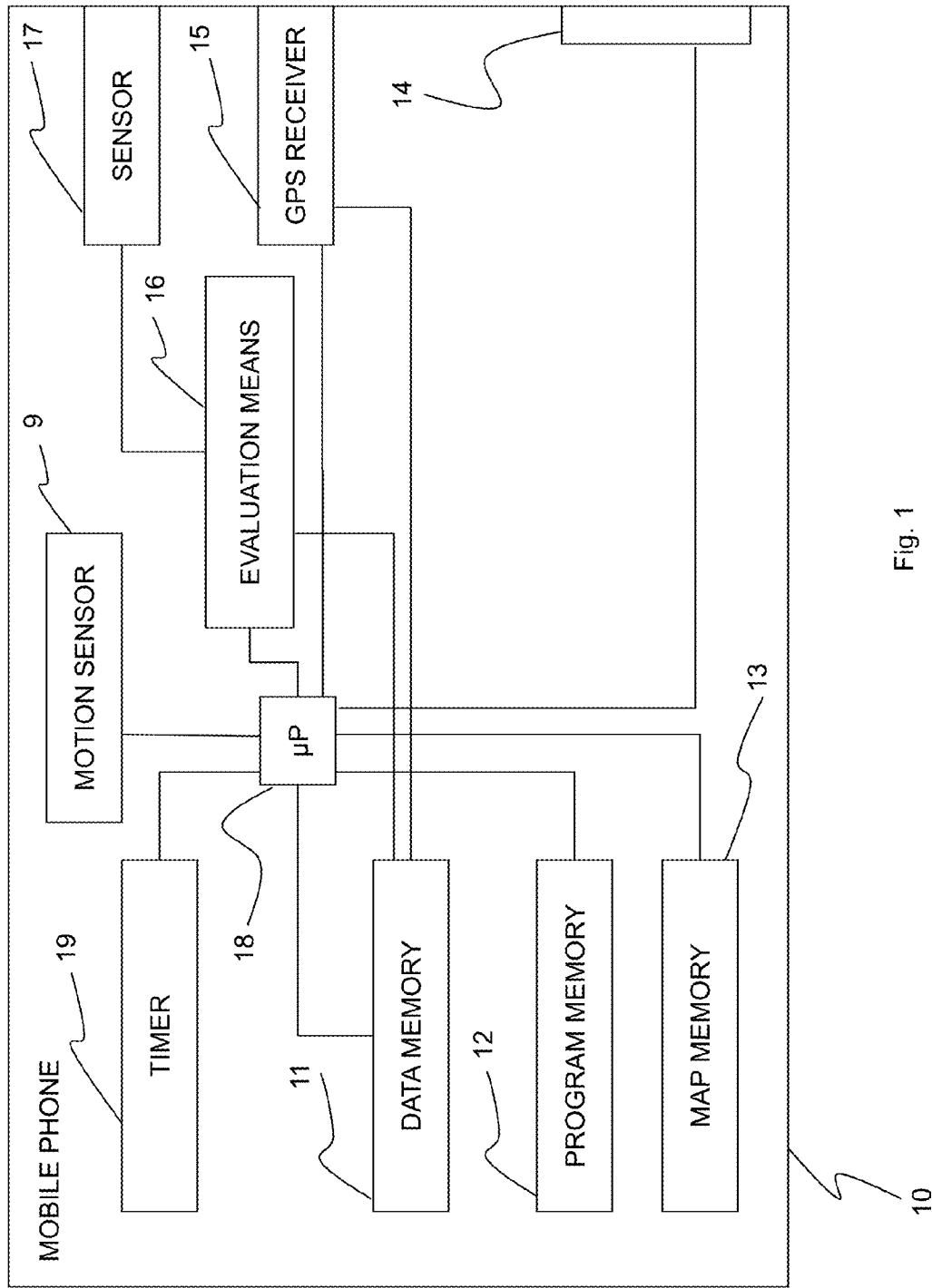
FIG. 1 shows a mobile communications device in which the invention is implemented.

In an embodiment, the invention provides an alternative measure which allows to improve positioning of a mobile communications device or to determine the position of a mobile communications device even if the mobile communications device initially cannot provide positioning on its own and, for example, cannot receive and/or evaluate GPS-based position signals.

It should first be mentioned that the term "mobile communications device" is intended to include mobile wireless communications devices such cell phones, smartphones, PDAs, and the like.

One aspect of the invention can be seen in the fact that for determining the position of a mobile communications device, position information, i.e. the position and possibly also the accuracy of the position, of at least one other mobile communications device is used, and/or of at least one static communications device, and at least one observation value which defines the positional relationship between the at least two communications devices.

For mobile communications devices, such as a smartphone, one can usually assume that when they move their position will not be exactly known, i.e. not without error, and thus the standard deviation of a coordinate does not become zero, for example. If their position is known during or after movement, then it is stochastically defined, i.e. it is not known without error, and the coordinates thereof will then have standard deviations greater than zero, for example. If very good positioning information for mobile communications devices is available, it may even be used as error-free positions in the further evaluation process, deliberately relinquishing the strictness of an adjustment model, i.e. as definitions under constraint, if the neglect of strictness can be estimated and tolerated.

The position of static communications devices, such as a Wi-Fi access point, is usually available with high accuracy when compared to mobile communications devices, so that these static devices, by deliberately relinquishing the strictness of an adjustment model, are often used as error-free positions, by formulating an algebraic constraint. However, it is also possible for a static communications device to be treated as a stochastically defined position in a network adjustment process, and thereby to receive corrections through the adjustment, or to be checked in its values, for example using a statistical hypothesis test.

It is also possible, in the adjustment process, to use stochastically defined positions which are determined either from approximate calculations at substantially the same time or from measurements valid at an earlier time, as special observations, and these stochastically defined positions may even be subject of improvement in the adjustment process.

If one of the communications devices is a mobile one, usually the time of a measurement from and to such a communications device is important in order to be able in a network adjustment to relate all parameters to a single point in time for temporarily defining a geometric position network of a joint snapshot.

The position network covers all coordinate directions, i.e. including the height of a three-dimensional network.

If there are differences in the times of determination of individual input parameters of a network adjustment, the impact thereof may be estimated and may either be tolerated or at least partially corrected for by applying corrections to the absolute values of the input parameters and/or their accuracies.

According to a further aspect of the invention, the position of at least one mobile communications device and optionally also the accuracy of the position can be determined using a network adjustment which may be performed based on mathematical models and conditional equations known from geodesy.

For adjustment of a geometric network which comprises coordinate system dependent elements, inter alia, a definition of a coordinate system is required which defines the relation of the coordinate system dependent parameters. This definition is effected, for example, by defining the coordinates of origin, the direction of the three coordinate axes, and a common scale. This definition may be effected in various ways, and may for example be implemented by error-free and/or statistically based specifications and/or by specific algebraic restrictions to define a free network adjustment.

How the definition is to be made in an individual case will depend, among other things, from known circumstances such as:

Which information is available and how good is it, and how well is mutual checking of this information?
Which kind of target coordinate system is required, an absolutely defined coordinate system, or will any calculation coordinate system suffice for representing target parameters adjusted relative to one another?

The quality of the available information and the question of the target coordinate system also have an influence on whether a network adjustment is performed in a free network whose definition does not have an adverse impact on the statistically based search for grossly erroneous input errors, i.e. the search for outliers.

A coordinate system for network adjustment may for example be defined as a not pure calculation coordinate system of a free network by defining the input parameters which in the adjustment algebraically depend on the coordinates of the adjustment coordinate system, by a sufficient number of these coordinates in the adjustment process, for instance as error-free quantities under constraint, or as stochastically defined quantities, such as a coordinate with its standard deviation. Network adjustment may also be performed in a coordinate system which represents a partially free network, i.e. in which not all of the coordinate system parameters are determined by the rules of a free network, for example when it is intended that the heights of the points are known without error, but the coordinates of the horizontal plane are adjusted in a free network.

By specifying coordinates and/or functions of coordinates under constraint and/or stochastically, it is possible to generate, by algebraic definitions, free network adjustments, partially free network adjustments defined under constraint or stochastically, and their calculation coordinate systems in different combinations thereof.

If the coordinate unknowns to be determined are in a geometric network, a higher number of unknowns is required in the free network adjustment for solving the equations, and thus an increased computational complexity in the evaluation.

For the method according to the invention which in one of its aspects comprises an improvement of the coordinates and their standard deviations of a communications device by using additional observation information about other communications devices at substantially the same time as the validity time of the already available position, it is important what has been described so far about network adjustments and in particular about the stochastic definition of the coordinate system by stochastically defined coordinates, the available coordinates and the standard deviations thereof, to understand the algorithm of the method. If no appropriate prior information is available, for example no prior adjustment and no measurements of targets known under constraint or stochastically, a free network can be used as a form of adjustment.

If a plurality of adjustment results of overlapping geometric networks are available that are valid at substantially the same time, for example including common mobile communications devices, these different network adjustment results may be further improved by known block adjustments, by jointly adjusting these blocks of estimated points taking into account their respective variance-covariance matrices, as a post-processing step for the purpose of further improving or checking the positions. Thereby, the common points and also the non-common points will be improved in terms of their coordinates and their accuracy. Relevant differences in the validity time may be taken into account, at least partially, similar to additional observation information.

If a calculation coordinate system of a geometric network adjustment does not correspond to the target coordinate system, it is possible, by similarity transformations, to subsequently transform the network including the accuracies of the points into another predefined target coordinate system, unless this can already be implemented in the initial adjustment.

Everything described so far may be evaluated and decided in a mobile communications device or in a server, i.e. in particular the decision to select the type of network adjustment that is to be applied, the definition of the coordinate system and of the required additional observation information about other communications devices to obtain an intended accuracy for determining the position of a mobile communications device and/or of communications devices in its neighborhood involved through the network geometry.

Another aspect of the invention can be seen in the fact that a plurality of mobile communications devices and, optionally, at least one static communications device may temporarily be regarded as stable position points of a geometric network, wherein the connecting lines of the points may be regarded as symbolized measurements between the communications devices. All measurements and position calculations are related to the one point of a communications device that defines the position of the communications device.

Conceptually, it is usually assumed that the positions of the mobile communications devices are only approximately known prior to the estimation, if at all, and are intended to be improved by the estimation. Correspondingly, it is usually assumed conceptually that the positions of the static communications devices are known with sufficient accuracy prior to the estimation, and are not intended to be improved by the estimation. When deviating from this rule, a mobile communications device may be considered as a static communications device, and vice versa it is possible for a static communications device to be considered as a mobile communications device whose position is to be determined for a first time or is to be improved. The evaluation program may preliminarily decide on this based on some criteria.

According to another advantageous aspect, at least three communications devices among which is at least one mobile communications device may temporarily be considered as stable position points of a geometric network which is adjusted by the network adjustment technique.

The network adjustment is in particular used to not only determine position coordinates but also their accuracy, i.e. the standard deviation thereof, for example.

Another aspect can be seen in the fact that the mobile communications devices may be Global Navigation Satellite Systems (GNSS) compatible communications devices which are each capable of determining their own position. This may be supported by a motion sensor of the communications device, for example, through dead-reckoning. These position values and observation values may be exchanged between selected mobile communications devices, for example using the Wi-Fi Direct communication protocol or the LTE Direct communication protocol, and can be used in a network adjustment to improve positioning.

The invention will now be explained in more detail by way of several exemplary embodiments with reference to the accompanying drawings. In the drawings:

FIG. 1 shows a mobile telephone as an example of a mobile communications device 10, in particular a smartphone. Smartphone 10 may be used in a wireless communication network such as those partially shown in FIGS. 3 to 5 and 7.

Smartphone 10 comprises a wireless data communication interface 14 which enables it to exchange data with other mobile and/or static communications devices. Interface 14 may be a Wi-Fi Direct compatible or a Long Term Evolution (LTE) Direct compatible interface. As will be explained in detail below, smartphone 10 is capable to receive, via data communication interface 14, the position information of at least one other mobile communications device and/or of at least one static communications device, inter alia. Such position information which may be generated by the respective communications device itself, for example by using a GPS receiver, includes for example information about at least one position coordinate, the accuracy thereof, and, optionally, a validity time.

Smartphone 10 further comprises a memory 11 which is referred to as a data memory. Data memory 11 may be used to store own position information and/or position information from other communications devices and at least one observation value which defines the positional relationship between two communications devices. Such position information may comprise at least one position coordinate, the accuracy thereof, and preferably a validity time. Instead of a validity time, a position information may include information that may be used to determine an appropriate validity time from previous position information and/or observation values by interpolation or extrapolation.

Further, smartphone 10 comprises a microprocessor 18 which is configured as a programmable control unit. Microprocessor 18 is adapted to determine the position coordinates of smartphone 10 and the accuracy of these position coordinates based on at least one observation value and the position information of at least one other communications device. The microprocessor is further adapted to control the communication with the other communications devices for the purpose of network adjustment involving communications device 10, and for this purpose it performs the instructions of a computer program stored in program memory 12.

Smartphone 10 may comprise at least one measuring unit 17 referred to as a sensor in FIG. 1, for measuring a measurement parameter which provides a contribution to the determination of a observation value. Measuring unit 17 may comprise known sensors which are preferably adapted for measuring a distance, an angle, or a direction to another communications device. It is conceivable that sensor 17 is adapted for measuring an angle between two communications devices which are located in the vicinity of smartphone 10. It is also possible that sensor 17 measures the signal strength of the transmission signal of another communications device, for example.

The measured signal produced by sensor 17 is supplied to a separate evaluation unit 16, for example. Alternatively, sensor 17 and evaluation unit 16 may form a single component. Evaluation unit 16 is adapted to determine, based on the measured signal received, the corresponding observation value which defines the positional relationship between smartphone 10 and another communications device (not shown), or between two other communications devices.

For being capable of determining its own position, smartphone 10 may comprise a Global Navigation Satellite System (GNSS) compatible receiver which is a conventional GPS receiver 15 in the present example. GPS receiver 15 is adapted for receiving and evaluating position signals of a satellite system. Based on the position signals a position information is obtained, which includes the position coordinates of smartphone 10, the accuracy of these position coordinates, and preferably also a validity time. The accuracy is usually specified as a standard deviation.

To bridge gaps in the GPS signals, the smartphone may additionally comprise a motion sensor 9 which for example detects changes in positional relationship with short-term stability without making measurements to other communications devices for this purpose. GPS receiver 15 and sensor 9 together will then implement dead-reckoning by joint processing of their data, which is performed by microprocessor 18.

Smartphone 10 may comprise a further memory 12 which is referred to as a program memory in FIG. 1. Program memory 12 may store at least one optimization algorithm for estimating position coordinates and their accuracy, and preferably for determining a validity time. It should be mentioned already at this point, that program memory 12 stores, by way of example, an optimization algorithm for performing a free network adjustment and an optimization algorithm for performing a network adjustment using a predetermined coordinate system, for example a coordinate system a priori known. Microprocessor 18 is adapted to access and execute one of the two optimization algorithms, for example in response to some event or situation, in order to determine its own position and/or the position of at least one other mobile communications device, and/or to improve its position as determined by the GPS receiver. Depending on the application, the optimization algorithms may include systems of equations which are based on a statistical model, in particular a Gauss-Markov model, or a heuristic model. Such systems of equations and models are well known. Preferably, the optimization algorithms and network adjustments are based on the known method of least squares. In the network adjustment, the position coordinates of smartphone 10 and the accuracy thereof may be used as the unknown parameters to be determined, and a common validity time is used for these parameters to be determined and for at least one measured observation value and, optionally, the position coordinates and their accuracy of other communications devices.

Microprocessor 18 may be adapted to repeatedly execute the optimization algorithms stored in program memory 12, if necessary, and then based thereon to perform an additional coordinate system transformation of the position information into another predefined target coordinate system, or to perform a block adjustment of partially or completely overlapping geometric networks that have already been pre-adjusted, in order to improve or check the position information. For this purpose, the necessary data may be used from data memory 11 and from a data transfer via communication interface 14.

The computer programs for block adjustment and for coordinate system transformation may preferably also be stored in program memory 12.

Another memory 13 may be provided in smartphone 10 to store an electronic geographical map which includes navigable elements. The navigable objects of that geographical map enable a computer program to determine navigation instructions that allow navigation from one object to another object even via further objects, wherein the objects may be point objects and/or spatial objects.

In addition to the exemplary Wi-Fi Direct compatible or LTE Direct compatible data communication interface 14, further communication interfaces may be implemented in smartphone 10, such as interfaces in compliance with the Bluetooth standard, or Near-Field Communication interfaces (NFC interface, Near Field Communication IF), such as NFC RFID (NFC Radio Frequency Identification) compatible interfaces.

Furthermore, smartphone 10 may include a timer 19. Timer 19 may serve to initiate microprocessor 18 at a predetermined validity time to enable sensor 17 and GPS receiver 15 and sensor 9 to determine a observation value and/or the position of the smartphone. Moreover, microprocessor 18 may be adapted to access and execute one of the stored optimization algorithms in response to the validity time supplied by timer 19.

In addition, in order to facilitate the network adjustment by the optimization algorithms, microprocessor 18 may be adapted to start, in advance, the operations which recognize the appropriate communications devices in the vicinity, read the position information thereof and cause measurements to be performed between the communications devices, and to have them transmitted to communications device 10.

Moreover, microprocessor 18 may be adapted to perform a block adjustment or to effect a similarity transformation into a target coordinate system in response to the validity time supplied by timer 19.

In case of a network adjustment being performed, microprocessor 18 may be adapted to determine the position coordinates of smartphone 10, and optionally the position coordinates of the at least two other communications devices, and the accuracies of each of these position coordinates, and a validity time.

Figure 2:
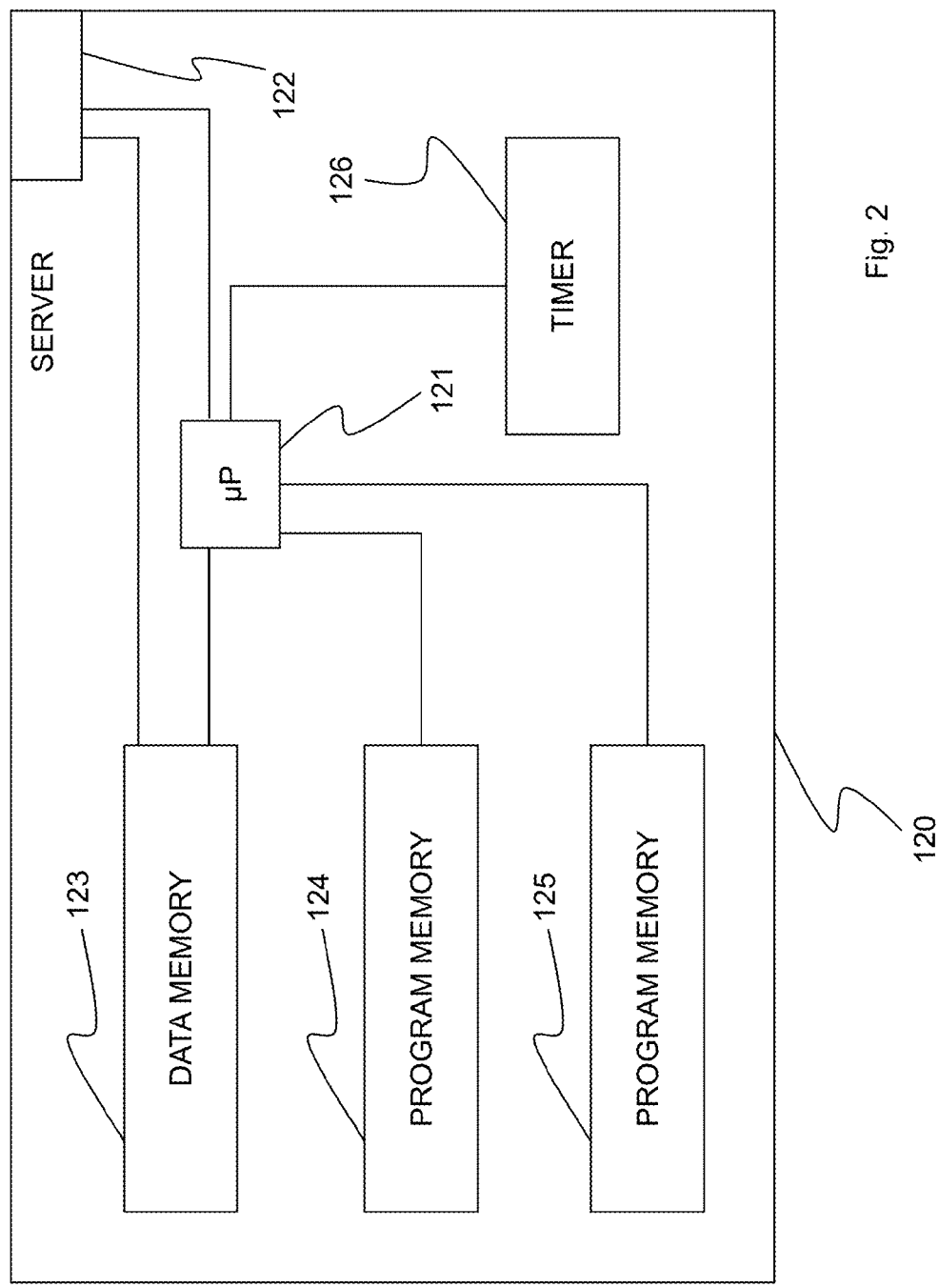
FIG. 2 shows a central communications device in which the invention is implemented.

FIG. 2 shows a central wireless communications device 120 in form of a server which comprises a wireless data communication interface 122 configured according to the Wi-Fi Direct standard protocol or the LTE Direct standard protocol, for example. Wireless data communication interface 122 enables server 120 to exchange data with smartphone 10 and for example with mobile communications devices 20 to 40 shown in FIG. 3. In particular, server 120 may receive, from other communications devices, position information and observation values and the validity times thereof, which can be stored in a data memory 123. A program memory 124 may store an optimization algorithm that is based on a free geometric network adjustment for estimating the position coordinates of a mobile wireless communications device. A further program memory 125 may be provided, which may store an optimization algorithm for estimating position coordinates, which is based on a geometric network adjustment using a coordinate system predefined at least partially under constraint, or stochastically. One of program memories 124 or 125 may additionally store an algorithm that performs a transformation of the results of a network adjustment into another predefined target coordinate system, and/or that performs a block adjustment of several overlapping geometric networks that may even only partially overlap each other. Server 120 has a programmable control unit 121 implemented, such as a microprocessor 121, which may access program memories 124 and 125 in order to execute an optimization algorithm for estimating the position coordinates of a mobile wireless communications device and the accuracy of these position coordinates. Furthermore, a timer 126 may be provided in server 120, which is adapted, inter alia, to initiate microprocessor 121 at a predetermined validity time to perform a network adjustment for determining the position of a mobile communications device, and, if necessary, to subsequently transform it into a given target coordinate system, and/or to perform a block adjustment.

Figure 3:
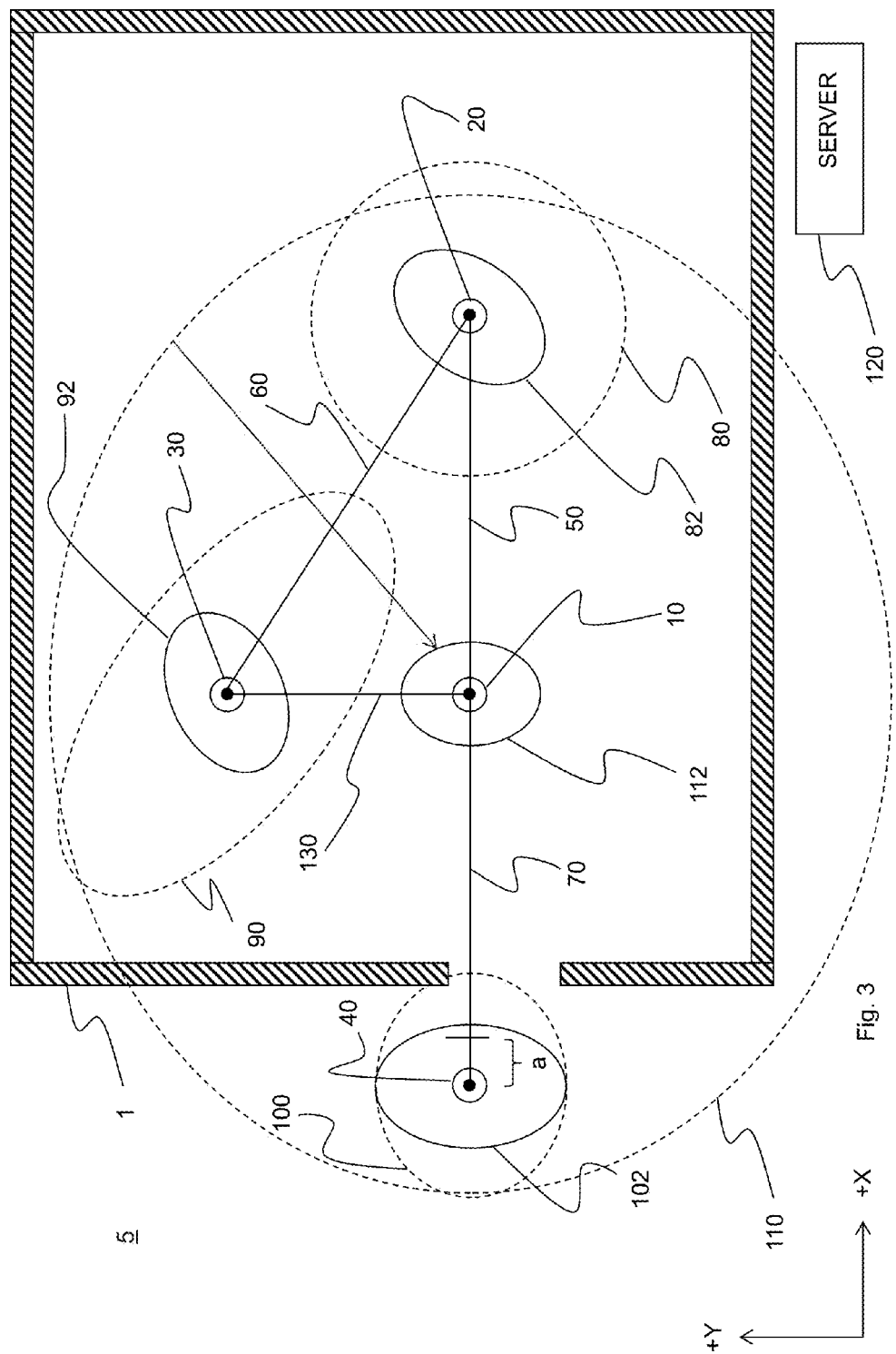
FIG. 3 shows an exemplary wireless communication network including four mobile communications devices.

FIG. 3 shows a first scenario. A portion of an exemplary wireless communication network 5 is shown, within which four mobile communications devices 10, 20, 30, and 40 temporarily form a group. This temporary group may be considered as a temporarily stable geometric position network of four points which are represented by the four mobile communications devices. Assuming, for the sake of simplification, that all Z coordinates are identical and are known without error, and that therefore the distance measurements only relate to the distance in the xy plane. 3-dimensional approaches are easily derivable therefrom, since the three-dimensional view clearly follows from a consideration of two non-parallel planes. This approach shall also apply to all other scenarios of FIGS. 4, 5, and 7.

The operation of the wireless communication network 5 shown in FIG. 3 will now be described in detail.

The following exemplary assumptions are made:
1. All four mobile communications devices 10 to 40 are smartphones that are similar to smartphone 10 shown in FIG. 1 in terms of their configuration and functionality.
2. Smartphones 10 to 40 reside in an exhibition center including a plurality of halls and in part move in a hall 1, in particular smartphones 10 to 30 are in hall 1 and only smartphone 40 is outside hall 1.
3. Smartphone 10 needs better position coordinates.
4. Smartphones 10 to 40 are Wi-Fi Direct compatible, so that smartphones 10 to 40 are capable of communicating with each other via the standardized Wi-Fi Direct protocol.
5. Although smartphones 10 to 40 move in a three dimensional coordinate system (having coordinates x, y, and z), for the network adjustment for positioning purposes the coordinate system is reduced to a plane (having coordinates x and y) assuming that all smartphones 10 to 40 are sufficiently exactly at the same level. The network adjustment can therefore be limited to the determination of the xy coordinates.
6. Map memory 13 stores an electronic map of the exhibition center.

In order to be able to at least improve the position coordinates of smartphone 10 and to perform a reliable gross error detection, overdeterminations are needed with respect to the unknown parameters of a network adjustment. This is because in this case measurement errors can be detected and appropriately distributed, i.e. by being adjusted or by revealing observed values as outliers and eliminating them, as is well known.

Accordingly, in the present exemplary embodiment when performing a network adjustment the xy position coordinates of smartphones 10 to 40 are used as the unknown parameters, as will be explained below.

Then, positioning of smartphone 10 and simultaneously of the other smartphones 20, 30, and 40 will be performed in smartphone 10 by a network adjustment of the overall network.

In response to a predetermined event, a program is started in smartphone 10 which tries to improve the current position of smartphone 10. This program may be stored in memory 12. A manual input to smartphone 10 by the user may suffice as the trigger or event. This input may specify a location in the exhibition center. Microprocessor 18 may be adapted to determine, based on the digital map stored in memory 13 and on the location entered by the user, whether the current measurement accuracy of GPS receiver 15 in combination with dead-reckoning of an internal motion sensor 9, for example, is sufficient. If not, microprocessor 18 will start the program. It is also conceivable that microprocessor 18 is adapted to monitor the reception quality of GPS receiver 15 and to start the program as soon as the reception quality has dropped below a threshold value. It is further conceivable that server 120 prompts smartphone 10 to start the program.

Smartphone 10, once having started the program, will now start to scan its environment for mobile communications devices which might help to improve its position coordinates. One way to find suitable mobile communications devices is that mobile communications devices transmit their position information to smartphone 10, unrequested or at a request from smartphone 10 or from server 120. Each position information includes the position coordinates and their accuracy of the respective mobile communications device, and optionally a validity time. Microprocessor 18 of smartphone 10 may be adapted to estimate, based on the accuracy included in the received position information, whether the current position of smartphone 10 can be improved. In the present exemplary embodiment it is assumed that microprocessor 18 has calculated that the position information received from smartphones 20, 30, and 40 in combination with essentially simultaneous observations optionally to be performed between the smartphones and of a known accuracy level are appropriate to determine an improved position.

It is further assumed that the position information supplied by smartphones 20 to 40 include information indicating that the relevant smartphone has to be regarded as a mobile communications device, which means that it is likewise interested in improving its own position accuracy. In response to this information, microprocessor 18 decides that it has to access and execute the optimization algorithm based on a network adjustment from memory 12, and that in advance it needs to initiate the appropriate additional distance measurements.

Microprocessor 18 may be adapted to define a validity time or a validity interval, at or in which all input parameters are made available for the network adjustment, which input parameters particularly include position coordinates and the accuracy thereof, and observation values and the accuracy thereof. This validity time may be transmitted from smartphone 10 to smartphones 20 to 40. It should be noted here that any method for synchronizing the determination of observation values and position information can be employed.

Moreover, microprocessor 18 may be adapted to cause smartphone 10 to determine its positional relationship to smartphones 20, 30, and 40 at the validity time, and in addition to cause smartphone 20 to determine its distance to smartphone 30 at the validity time. This prompt could also be triggered by server 120. For this purpose, distances 50, 60, 70, and 130 can be measured, for example. Accordingly, sensor 17 of smartphone 10 will, for example, measure the received signal strengths of each of smartphones 20, 30, and 40, and with the transmitted signal strengths known the distance can be calculated therefrom in known manner. The transmitted signal strength may be constant, for example based on the knowledge of the transmitter, or may be modulated onto the signal as an additional information. Communications device 10 may receive the information of a constant transmitted signal strength as an additional specification of smartphones 20, 30, and 40, for example, in addition to the position information. Evaluation unit 16 converts the measured signal strengths into corresponding path lengths. In this manner, paths 50, 130, and 70, and hence the positional relationship of smartphone 10 to smartphone 20, to smartphone 30, and to smartphone 40 are determined. The measured path lengths are stored in data memory 11 as observation values, and optionally together with the validity time and a system related measurement error 'a', which is shown in FIG. 3 for smartphone 40, by way of example. Similarly, smartphone 20 may measure distance 60 and may transmit the measured value as a observation value to smartphone 10, preferably together with the validity time and a system related measurement error 'a'. This observation value is also stored in data memory 11, together with the measurement error 'a' and the validity time.

The current position of the smartphone shall be stochastically given by error ellipse 110. In order to be able to improve this position of smartphone 10, microprocessor 18 accesses the optimization algorithm which is based on a network adjustment with stochastic definition of the calculation coordinate system in program memory 12, reads the position information of smartphones 10 to 40 and the four observation values together with the measurement error 'a' from memory 11, and performs the network adjustment. As a result of the network adjustment, the unknown parameters, i.e. the xy position coordinates of smartphone 10 and the accuracy of these position coordinates, and, if desired, also the xy position coordinates of smartphones 20, 30, and 40 and the accuracy of the respective position coordinates are determined Microprocessor 18 may be adapted to compare the position coordinates as determined at the validity time by GPS receiver 15 and by the dead-reckoning using sensor 9, and the accuracy thereof, with the position coordinates of smartphone 10 as determined by the optimization algorithm i.e. the network adjustment, and the accuracy thereof. If the position coordinates determined by the network adjustment and the accuracy thereof are better than the position data provided by GPS receiver 15 and dead-reckoning using sensor 9, the position data of the dead-reckoning, i.e. the poor accuracy of error ellipse 110 in the present example, is replaced by error ellipse 112. The accuracy of the position of smartphone 10 is thus improved from ellipse 110 to error ellipse 112. For the purpose of better comparability of the different accuracies, the absolute values of the positions of all smartphones were identically maintained before and after the network adjustment, which however usually is not true because of the spread of real individual errors. The absolute positions will have a random spread according to the associated error ellipses when there is a spread of real individual errors.

In the present case, network adjustment was performed in such a manner that the positions and error ellipses 80, 90, 100, and 110 of smartphones 10 to 40 were adjusted at the same time together with the 4 distance observations 50, 60, 70, and 130, each with a standard deviation 'a', since the subsequent additional distance observations are provided substantially at the same time as the previous positioning as defined by ellipses 80, 90, 100, and 110. Would the time of distance observations be much later, the positioning of the smartphones as provided by the GPS receiver and the dead-reckoning substantially at this later time would be used instead of ellipses 80, 90, 100, 110. In the present case the position accuracies after adjustment are represented by ellipses 82, 92, 102, and 112, which each have a smaller area.

In the special case that smartphone 10 or one of the other smartphones did not perform an own positioning based on GPS and dead-reckoning, their ellipses would not contribute to the network adjustment, and the ellipses after network adjustment would then usually be larger ellipses than the present ellipses 82, 92, 102, and 112. For defining the 2-dimensional planar coordinate system, 3 randomly defined coordinates in specific positions to each other will be sufficient here, for example a two-dimensional full-pass point and one coordinate of one other point that is not identical to the first point.

In another special case, at least one of the smartphones could define at least some degrees of freedom of a calculation coordinate system under constraint, as not stochastically in its position but with a standard deviation of zero under constraint. This could even be done deliberately, although the coordinates used for this purpose are not known without error. Then one would have a network adjustment with a calculation coordinate system at least partially defined under constraint. When deliberately defining erroneous coordinates under constraint, a result for the accuracies of the other coordinates after the network adjustment is a poorer accuracy of the coordinates on average, since the errors set to zero are imposed to the other unknowns, which tends to be seen in FIG. 4, although one distance observation less is used there.

Smartphones 20, 30, and 40 shown in FIG. 3 and/or server 120 may be adapted to transmit request commands to smartphone 10, which will cause the microprocessor 18 when processing the optimization algorithm to determine not only the position coordinates and their accuracies of smartphone 10, but also the position coordinates and their accuracies of smartphones 20 to 40, for which purpose these coordinates have to be defined as unknowns in the adjustment, that means they must not be defined under constraint, and they are simultaneously determined in combined manner in one system of equations. Depending on the implementation, these position coordinates and the accuracies thereof are transferred from smartphone 10 to the respective smartphone 20, 30, and 40. In other words, smartphones 20 to 40 will benefit from the network adjustment performed in smartphone 10, since their positions may be improved at the same time.

A positive effect of performing a network adjustment in smartphone 10 using a stochastic predefinition of all coordinates by dashed error ellipses 80, 90, 100, and 110 can be graphically illustrated with reference to FIG. 3. A dashed error ellipse is drawn around each smartphone, the error ellipse indicating the current uncertainty range within which the relevant smartphone may be located, with a predefined probability of approximately 68% for normally distributed individual errors. These error ellipses may be calculated in conventional manner from a determination based on GPS and dead-reckoning. For example, error ellipse 110 around smartphone 10 reflects the current accuracy of GPS receiver 15 and of the dead-reckoning using sensor 9. The same applies to error ellipse 80 drawn around smartphone 20, to error ellipse 90 drawn around smartphone 30, and to error ellipse 100 drawn around smartphone 40. The dashed error ellipses reflect the accuracies without the method of the invention, i.e. without additional distance measurements and without the network adjustment.

Once the network adjustment has been performed in smartphone 10, the positions of smartphones 10 to 40 may have improved. This result is illustrated by solid error ellipse 112 around smartphone 10, by solid error ellipse 82 around smartphone 20, by solid error ellipse 92 around smartphone 30, and by solid error ellipse 102 around smartphone 40 as compared to the larger dashed ellipses having the same center.

If, for example, microprocessor 18 of smartphone 10 determines, after the execution of the network adjustment, that the position coordinates for smartphone 10 determined from the network adjustment and the accuracy thereof is not better than the data provided by GPS receiver 15 and the dead-reckoning, microprocessor 18 may restart the program to improve the position of smartphone 10, and for this purpose it may use additional observation values whose collection and transfer it may initiate in advance.

Depending on the implementation and/or the current network state, smartphone 10 may again perform the same procedure described above. This means that a) smartphones 20 to 40 are requested to determine their position coordinates and the accuracy thereof at a new validity time, and to transfer these data as position information to smartphone 10;

b) smartphone 10 itself measures distances 50, 70, and 130 and prompts smartphone 20 to measure distance 60 and to transmit the associated observation value and its accuracy to smartphone 10; and that c) under control of microprocessor 18 the optimization algorithm based on a network adjustment is performed for determining the position coordinates, the accuracy thereof and the validity time for smartphone 10 and, optionally, for smartphones 20 to 40.

However, it is also conceivable in the re-execution of the optimization algorithm based on a network adjustment to take into account the position coordinates received most recently and their accuracy relating to other mobile communications devices, and optionally further observation values. It is furthermore conceivable that some of the smartphones 20 to 40 and some of the distances 50, 60, 70, and 130 are no longer taken into account. In other words, smartphone 10 together with other mobile communications devices forms a new group within communication network 5, which may likewise be considered as a temporary geometric position network of temporarily stable position points for which a network adjustment can be applied. Smartphone 10 may cause the optimization algorithm to be repeated until the position coordinates of smartphone 10 have been improved sufficiently.

Although the wireless communication network 5 shown in FIG. 3 is based on the Wi-Fi Direct standard and is employed in an indoor area, any other communications networks may be used, including communication networks with indirect connections between the mobile communications devices, i.e. connections via base stations or routers. In other words, the configuration of the communication network and the choice of communication protocols used is without significance. It only has to be ensured that position information and observation values can be exchanged in time between the mobile communications devices, which include smartphones 10 to 40 in FIG. 3, and optionally to server 120.

The positioning by network adjustment which is performed in server 120 will now be explained.

According to one embodiment, server 120 collects position information from mobile communications devices 10 to 40 of communication network 5, regularly or at predetermined points in time, and, if necessary, additionally their options and conditions to participate in measurements between communications devices. So, server 120 not only knows the position of the mobile communications devices but also the accuracy of the respective position, and for example also the signal strengths upon transmission of a signal from which a distance is to be derived. For initiating the process of initial positioning or for improving the position of smartphone 10, several scenarios are conceivable. In one scenario, smartphone 10 directly requests server 120 to improve its current position because the current positional accuracy of error ellipse 110 is no longer sufficient. Also conceivable is another scenario in which server 120 monitors all mobile communications devices.

Assuming, in the present case, that smartphone 10 is adapted to request server 120 to improve its current position coordinates.

The server 120 then starts to find, from the position information gathered from mobile communications devices 20 to 40 and stored in data memory 123, those mobile communications devices that may help to improve the position coordinates of smartphone 10. Again it shall be assumed that the position information received from smartphones 20, 30, and 40 are appropriate, in combination with additional observations to be performed between the communications devices, to determine an improved position for smartphone 10.

Further, it shall be assumed that the position information received from smartphones 10 to 40 include information signalling server 120 that the respective smartphone has to be regarded as a mobile communications device. In response to this information, microprocessor 121 knows that it has to access and execute the optimization algorithm based on a network adjustment from memory 124, without any constraint by the already existing positioning of smartphones 10 to 40. Alternatively, the server could treat some coordinates of high accuracy as coordinate definitions under constraint in the network adjustment, unless these coordinates are likewise intended to be improved or checked in the network adjustment.

Microprocessor 121 may be adapted to define a validity time or validity interval, at or in which all unknown parameters are provided for the network adjustment, i.e. in particular the position coordinates of smartphones 10 to 40, and, optionally, observation values. This validity time may be transmitted from server 120 to smartphones 10 to 40. Further, microprocessor 121 may be adapted to transmit a control signal to smartphone 10, which causes smartphone 10 to determine its positional relationship to smartphones 20, 30, and 40 at the validity time. Furthermore, microprocessor 121 may be adapted to transmit a control signal to smartphone 20, which causes smartphone 20 to determine its positional relationship to smartphone 30 at the validity time. Accordingly, sensor 17 of smartphone 10 will perform a distance measurement to each of smartphones 20, 30, and 40 based on signal strength, for example. Evaluation unit 16 converts the measured signal strengths into corresponding path lengths. In this manner, the length of paths 50, 130, and 70 is determined. The measured path lengths are transmitted to server 120 as observation values, and optionally together with the validity time and the system related measurement error 'a', and are stored in data memory 123. Similarly, smartphone 20 may measure path 60 and may transmit the measured value as a observation value to server 120, preferably together with the validity time and a system related measurement error 'a'. This observation value is also stored in data memory 123, together with measurement error 'a' and the validity time. Further, server 120 will prompt smartphones 10 to 40 to determine, at the agreed validity time, their position coordinates and the accuracy thereof using the implemented GPS receivers and the dead-reckoning of sensors 9. Each smartphone will then transmit a position information to server 120, including the position coordinates, the accuracy thereof, the validity time, and an identification of the respective smartphone. The position information received are also stored in data memory 123.

In order to be capable to improve the position of smartphone 10, microprocessor 121 will then access the optimization algorithm based on a network adjustment from program memory 124, reads the position information of smartphones 10 to 40 and the four observation values together with measurement error 'a' from memory 123, and performs the network adjustment. As a result of the network adjustment, the unknown parameters, i.e. the xy position coordinates of smartphone 10 and the accuracy of these position coordinates, and, if desired, also the xy position coordinates of smartphones 20, 30, and 40 and the accuracy of each of these position coordinates are determined Microprocessor 121 may be adapted to compare the position coordinates as determined at the validity time by GPS receiver 15 and by sensor 9, and the accuracy thereof, with the position coordinates of smartphone 10 as determined by the optimization algorithm i.e. the network adjustment, and the accuracy of these position coordinates. If the position coordinates determined by the network adjustment and the accuracy thereof are better than the position data provided by GPS receiver 15 and sensor 9, these position coordinates and the accuracy thereof is transferred to smartphone 10 and can be adopted there. Regardless of the accuracy obtained, the result of the network adjustment may be transferred from server 120 to smartphone 10 and/or to smartphones 20 to 40, for example when requested by smartphone 10 or by the other smartphones 20 to 40 involved, or based on a configuration setting in server 120.

If, for example, microprocessor 121 of server 120 determines, after the execution of the network adjustment, that the position coordinates relating to smartphone 10 determined from the network adjustment and the accuracy thereof is not better than the data provided by GPS receiver 15 and sensor 9, microprocessor 121 may restart the program to improve the position of smartphone 10.

Depending on the implementation and/or the current network state, server 120 may again perform the same procedure described above. This means that a) smartphones 20 to 40 are requested to determine their position coordinates and the accuracy thereof at a new validity time, and to transfer these data as position information to server 120;
b) smartphone 10 measures distances 50, 70, and 130, and smartphone 20 measures distance 60, and the associated observation values are transmitted to server 120; and that
c) under control of microprocessor 121 the optimization algorithm based on a network adjustment is performed for determining the position coordinates, the accuracy thereof and the validity time for smartphone 10 and, optionally, for smartphones 20 to 40.

However, it is also conceivable in the re-execution of the optimization algorithm based on a network adjustment to take into account position coordinates and their accuracy relating to other mobile communications devices, and optionally further observation values. It is furthermore conceivable that some of the smartphones 20 to 40 and some of the distances 50, 60, 70, and 130 are no longer taken into account. Server 120 may cause the optimization algorithm to be repeated until the position coordinates of smartphone 10 have been improved appropriately.

Since the optimization algorithm based on a network adjustment is substantially completely performed in server 120, the load on the batteries of smartphones 10 to 40 is reduced.

According to an alternative embodiment it is contemplated that server 120, although receiving and observation the position information from smartphones 10 to 40, only prompts smartphone 10 to perform the network adjustment itself. In this case, server 120 will only inform smartphone 10 about the fact that smartphones 20, 30, and 40 have position information that could improve its position coordinates and the accuracy thereof, or the server only informs that there are other smartphones in the vicinity of smartphone 10 and at the same time transmits their coordinates and the accuracies of the coordinates.

According to another exemplary embodiment, it shall be assumed that smartphones 30 and 40 are not only members of the group comprising smartphones 10 to 40, but also members of another group, i.e. of another temporary stable geometric position network that comprises, for example, three further mobile communications devices, not shown. Moreover, it shall be assumed that the position coordinates of smartphones 30 and 40 and the accuracy of these position coordinates have also been determined at substantially the same time by a network adjustment relating to the other group which was also performed by server 120. Server 120 may be adapted to perform, based on the two network adjustments, a conventional block adjustment in order to improve the positions of all mobile communications devices involved.

Figure 4:
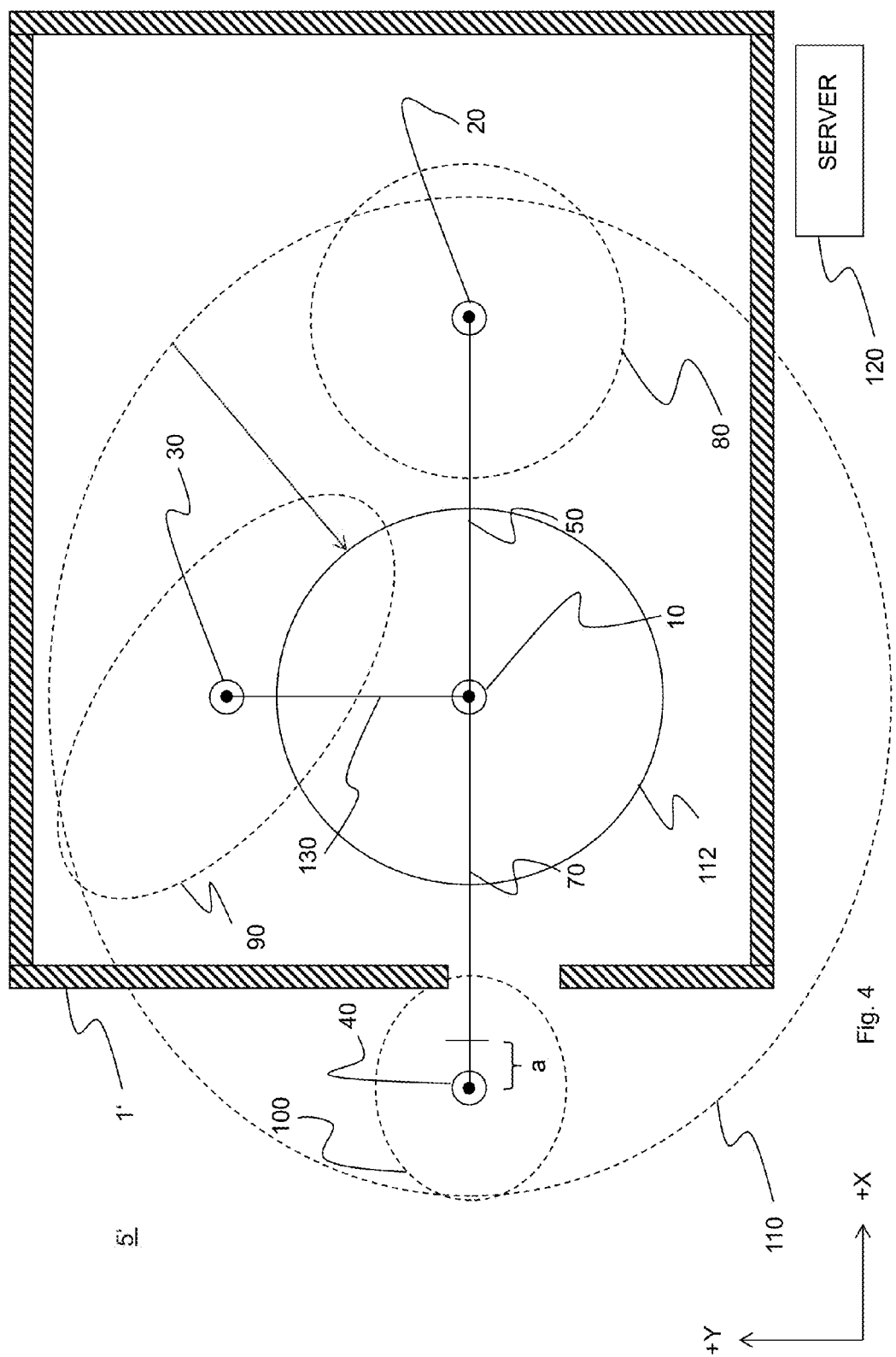
FIG. 4 shows an alternative wireless communication network, with three mobile communications devices which are treated as static communications devices, and with one mobile communications device.

FIG. 4 shows a second scenario. A portion of an exemplary wireless communication network 5' is shown, within which reside one mobile communications device 10 and three mobile communications devices 20, 30, and 40, which temporarily form a group. This temporary group may be considered as a temporarily stable geometric position network of four points which are represented by the four smartphones 10 to 40. All four mobile communications devices 10 to 40 are smartphones that are similar to smartphone 10 shown in FIG. 1 in terms of their configuration and functionality. Smartphones 10 to 30 are located in a hall 1', while smartphone 40 is located in an entrance area in front of hall 1'. It is assumed that smartphone 10 wants to improve its position accuracy and to this end wants to use all communications devices available in the range of sensor 17 for distance measurements, and this by taking into account the distance measurements to the smartphones, the position information transmitted from the smartphones involved in distance measurements, which now, however, are deliberately used approximated under constraint, and a network adjustment. In this case, the network adjustment will degenerate to an adjustment of a multiple foresight reading.

The operation of the communications devices shown in FIG. 4 corresponds to the arrangement shown in FIG. 3, except that the distance between smartphones 20 and 30 is not determined and that smartphone 10 decides that in the network adjustment the inaccurate positions of smartphones 20 to 40 shall be defined under constraint as error-free positions, so that the network adjustment cannot provide any improvements for these smartphones and therefore the results of the network adjustment need not be transmitted to smartphones 20 to 40. Since smartphones 20 and 30 are used in the network adjustment as being error-free under constraint, and since for this purpose the dead-reckoning information of the centers of error ellipses 80 and 90 are used, the distance between 20 and 30 need not be measured, since it would not provide any contribution in the network adjustment.

Server 120 likewise may be used in FIG. 4 like in FIG. 3, except that now the network adjustment is performed under constraint and therefore the communication and communication contents may change accordingly. Server 120 may further help smartphone 10 in finding smartphones in the vicinity, which are reachable with distance measurements, because server 120 is capable to determine the respective range from smartphone 10 to the other smartphones from the properties it knows and from the operating conditions of respective sensors 17, which were transmitted to server 120 from the smartphones.

The dashed ellipses in FIG. 4 represent the error ellipses that follow from the results of dead-reckoning of the relevant GPS receiver 15 and sensor 9. Assuming that distance measurements 50, 70, and 130 were all performed with an accuracy 'a' at substantially the same time as the positioning by dead-reckoning. A result of the network adjustment under constraint for smartphone 10 is that its error ellipse improves from 110 to 112, with 112 in FIG. 4 being substantially greater than the error ellipse 112 of FIG. 3. According to what was described above with reference to FIG. 3, the absolute position of smartphone 10 will usually change due to the additional distance measurements when employing real data and the individual errors thereof and adjustment thereof. For a better comparison of the error ellipses, however, the positions were chosen to be identical.

Microprocessor 18 may be adapted to define a validity time or a validity interval, at or in which the position coordinates and observation values are provided for the network adjustment. This validity time may be transmitted from smartphone 10 to smartphones 20 to 40.

Moreover, microprocessor 18 may be adapted to cause smartphone 10 to determine its positional relationship to smartphones 20, 30, and 40 at the validity time. In contrast to communication network 5 shown in FIG. 3, path 60 connecting smartphones 20 and 30 need not be measured because the end points thereof have been defined in the network adjustment as static points under constraint. Accordingly, sensor 17 of smartphone 10 will only measure distances 50, 70 and 130, for example in the manner described above. Evaluation unit 16 converts the measured signal strengths into corresponding path lengths. In this manner, distances 50, 130, and 70, and hence the positional relationship of smartphone 10 to smartphone 20, to smartphone 30, and to smartphone 40 are determined. The measured path lengths are stored in data memory 11 as observation values, and optionally together with the validity time and a system related measurement error 'a'.

In order to determine the position of smartphone 10, microprocessor 18 now accesses the optimization algorithm in program memory 12, which is based on a network adjustment using a predefined coordinate system. Also, it retrieves the position information of smartphones 20 to 40 and the three observation values together with the measurement error 'a' from memory 11 and performs a network adjustment using the predefined coordinate system. As a result of the network adjustment, only the xy position coordinates of smartphone 10 are determined as the unknown parameters of the network adjustment, and the accuracy of these position coordinates.

It should be noted here, that at a later time smartphone 10 may perform the network adjustment with stochastic definition of the coordinate system as explained with reference to FIG. 3, for example, to improve its position. It should further be noted that instead of smartphones 20 to 40 that are treated as static communications devices here, stationary communications devices may be used, which have fixed position coordinates associated therewith, such as wireless access points.

Once the network adjustment has been performed using the predefined coordinate system, only the position of smartphone 10 may have improved, since smartphones 20 to 40 were treated as static communications devices under constraint. This result is illustrated by the solid line of error ellipse 112 around smartphone 10.

Figure 5:
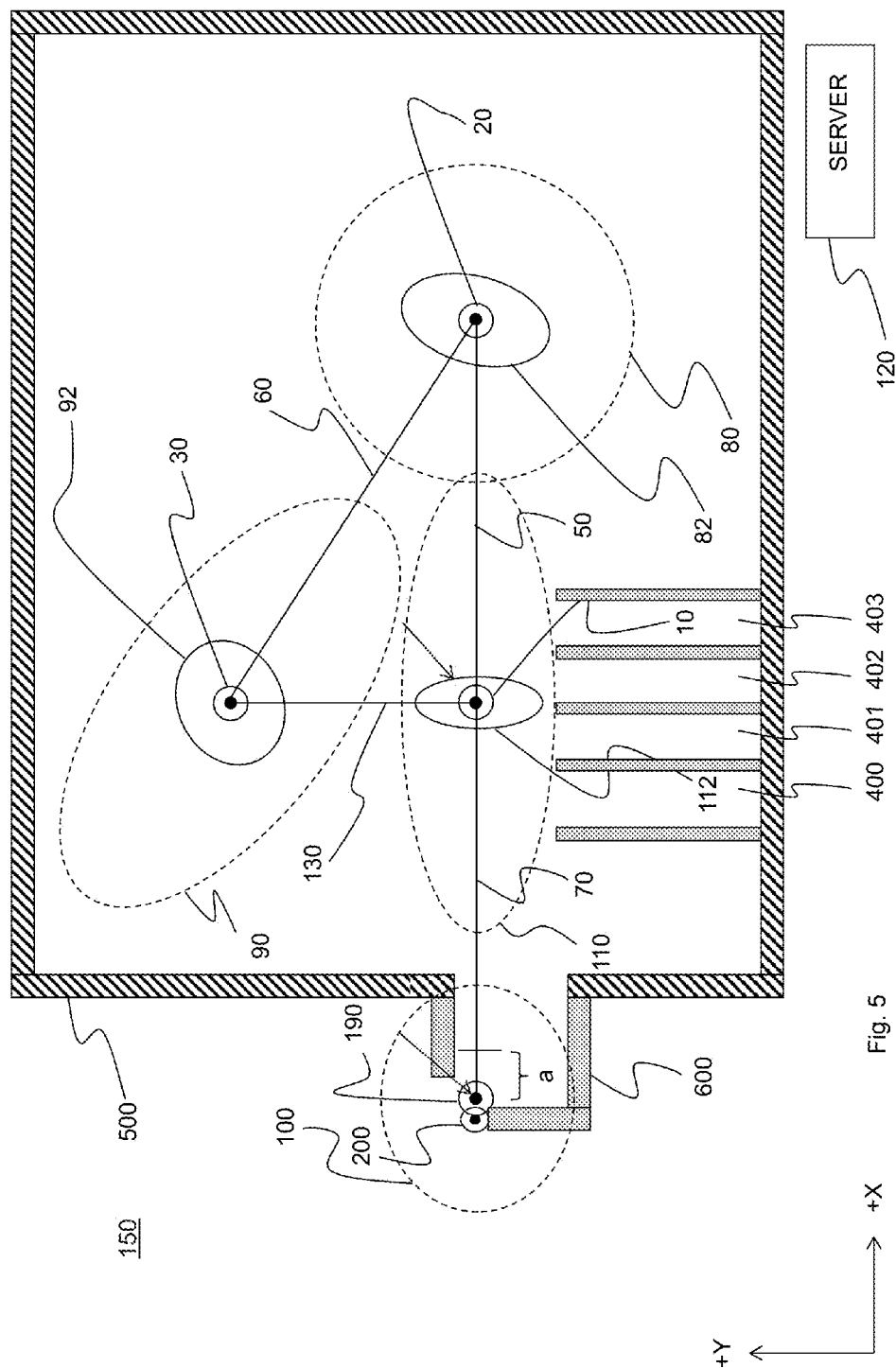
FIG. 5 shows another alternative wireless communication network, with one mobile communications device temporarily treated as a static communications device and one static communications device which use a near-field communication, and with three other mobile communications devices.

FIG. 5 shows a third scenario. A portion of an exemplary wireless communication network 150 is shown, within which, similarly to FIG. 3, three mobile communications devices 10, 20, and 30 and a mobile communications device 190 that is treated as a static communications device under constraint in the network adjustment temporarily form a group. This temporary group may be considered as a temporarily stable geometric position network of four points which are represented by the four smartphones 10, 20, 30, and 190.

The operation of the wireless communication network 150 shown in FIG. 5 is substantially identical to the operation of communication network 5 of FIG. 3, except for the differences that are caused by the very high position accuracy of smartphone 190.

The following exemplary assumptions are made:
1. Smartphones 10 to 30 correspond to smartphone 10 to 30 shown in FIG. 3 and are residing in an exhibition center including several halls, smartphones 10 to 30 being within a hall 500 and only smartphone 190 being outside hall 500.
2. Smartphone 190 may correspond to smartphone 10 shown in FIG. 1 in terms of its configuration and functionality, and it has a much higher accuracy than smartphone 40 shown in FIG. 3 or FIG. 4, since it has adopted, through contact with an NFC RFID 200, the highly accurate position information of the NFC RFID.
3. Smartphones 10 to 30 need a much better accuracy of their position coordinates, for navigation purposes.
4. The current positions of smartphones 10 to 30 and 190 and their accuracies as represented by the dashed error ellipses 80, 90, and 110 were determined without employing the method of the invention, only by using the respective GPS receiver and sensor 9, or by contact with an NFC RFID.
5. Smartphones 10 to 30 and 190 are adapted to immediately transmit to a server 120 and/or directly to the surrounding smartphones for example a huge leap in accuracy in improving their position and/or the attainment of a high absolute accuracy, this communication being accomplished via the respective interface 14.
6. It shall be assumed that in front of a check-in point 600 at the entrance of hall 500 the user of smartphone 190 had the positional accuracy of error ellipse 100, and by touching the NFC RFID 200 at the entrance control gets transmitted such a high position accuracy of the RFID 200 that smartphone 190 evaluates the position to be without error with sufficient accuracy, and adopts it as error-free.
7. Smartphone 190 is treated as a mobile communications device, but with a position that is assumed to be error-free, which is sufficiently realistic when compared to the other smartphones.

Moreover, it shall be assumed that the user of smartphone 10 wants to reach an intermediate destination at the end of a corridor 402. Next to corridor 402, FIG. 5 illustrates further corridors 400, 401, and 403, as well as the partition walls of the corridors.

The user of smartphone 10 now enters a destination position at the end of corridor 402 into his smartphone 10.

In response to the destination position entered, for example, smartphone 10 now starts a program to try to improve the current positioning of smartphone 10. Microprocessor 18 may be adapted to determine, based on the map stored in memory 13 and in response to the destination position entered by the user, whether the current measurement accuracy of GPS receiver 15 in combination with sensor 9 is sufficient. If not, microprocessor 18 starts the program. Microprocessor 18 may further be adapted to determine, based on the map stored in memory 13 and on the destination position entered by the user, which position coordinates or which direction of the error ellipse should be particularly improved. In the present case, the microprocessor detects that an improvement is mainly necessary in the x direction, because in the direction of corridor 402 smartphone 10 already has an acceptable accuracy, with error ellipse 110, and because for recognizing the input of corridor 402 the x direction is crucial and therefore the positioning of smartphone 10 needs to be improved in the x direction.

Smartphone 10 now starts to scan its environment for mobile and/or static communications devices that may be able to help to improve its position coordinates. Since smartphone 190 recently had transmitted its leap in accuracy achieved upon contact with NFC RFID 200 to all the smartphones in the vicinity and/or to server 120 together with its position information, smartphone 10 will recognize that it should include in particular smartphone 190 into a network adjustment with additional observations, since the direction from smartphone 10 to smartphone 190 is exactly in the x direction. In the present example it shall be assumed that at the time of the additional observations initiated by smartphone 10, i.e. distance measurements 70, 50, 60, and 130 with a standard deviation 'a' in each case, smartphone 190 still has the same position and accuracy of NFC RFID 200. Microprocessor 18 of smartphone 10 may be adapted to estimate, based on the accuracy included in the received position information, whether the current position of smartphone 10 can be improved. In the present exemplary embodiment it shall be assumed that microprocessor 18 calculated that the position information received from smartphones 20, 30, and 190 are appropriate to determine an improved position, in particular with a sufficient accuracy in the x direction. Further, it shall be assumed that the position information from smartphones 20, 30, and 190 include information which indicate that the relevant smartphone has to be regarded as a mobile communications device and therefore the time of the measurements and positioning has to be taken into account if it is not identical. The position information received from smartphone 190 is evaluated by smartphone 10 in comparison with the other accuracies with the result that the position of smartphone 190 is introduced into the network adjustment with a standard deviation of zero. The other positions are used as additional observations for stochastic definition of the coordinate system in the network adjustment.

Microprocessor 18 may be adapted to define a validity time or a validity interval, at or in which all unknown parameters, i.e. the position coordinates of smartphones 10 to 30, and 190 and, optionally, observation values, are provided for the network adjustment. This validity time may be transmitted from smartphone 10 to smartphones 20 to 30, and 190. Further, microprocessor 18 or server 120 may be adapted to causes smartphone 10 to determine on its own its positional relationship to smartphones 20, 30, and 190 at the validity time. In addition, in the present case, microprocessor 18 causes smartphone 20 to determine its positional relationship to smartphone 30. Accordingly, sensor 17 of smartphone 10 for example measures the received signal strengths of each of smartphones 20, 30, and 190. Evaluation unit 16 converts the measured signal strengths to corresponding path lengths. In this manner, distances 50, 70, and 130, and hence the positional relationship of smartphone 10 to smartphone 20, to smartphone 30, to smartphone 40, and to smartphone 190 are determined. The measured path lengths are stored in data memory 11 as observation values, and optionally together with the validity time and a system related measurement error 'a', which is shown in FIG. 5 for smartphone 190, by way of example. Similarly, smartphone 20 may measure distance 60 and may transmit the measured value as a observation value to smartphone 10, preferably together with the validity time and a system related measurement error 'a'. These observation values are also stored in data memory 11, together with the measurement error 'a' and the validity time.

It should be noted at this point that smartphones 10 to 30, and 190 may be adapted to exchange information informing the smartphones, whether a positional relationship between two smartphones can be measured or not. In the present case it shall be assumed that smartphone 30 recognizes that its positional relationship to smartphone 190 cannot be measured using a distance measurement based on signal strengths, for example due to wall shading. It will then inform the other smartphones about this condition.

In order to improve the positioning of smartphone 10, microprocessor 18 now accesses the optimization algorithm based on a network adjustment in program memory 12, retrieves the position information of smartphones 10 to 30 as observed unknown parameters, the four observation values, and the error-free position coordinates of smartphone 190 together with the measurement error 'a' from memory 11, and executes the network adjustment. In the present example it would even be sufficient to perform the network adjustment only with smartphones 10, 20, and 190, unless smartphone 30 would need to improve its positioning accuracy independently from smartphone 10 and at the same time. As a result of the network adjustment, the unknown parameters, i.e. the xy position coordinates of smartphone 10 and the accuracy of these position coordinates and, if desired, also the xy position coordinates of smartphones 20 and 30 and the accuracy of the respective position coordinates are determined Microprocessor 18 may be adapted to compare the position coordinates as determined by GPS receiver 15 together with sensor 9 at the validity time and the accuracy thereof with the position coordinates of smartphone 10 as determined by the optimization algorithm, i.e. the network adjustment, and the accuracy of these position coordinates. If the position coordinates as determined using the free network adjustment and the accuracy thereof are better than the previous position data, the previous position data are replaced.

Smartphones 20, 30 and/or server 120 may be adapted to transmit request commands to smartphone 10, which will cause microprocessor 18 to not only determine the position coordinates of smartphone 10 and the accuracy thereof when processing the optimization algorithm, but also the position coordinates and their accuracy of smartphones 20 and 30. Depending on the implementation, these position coordinates and the accuracy thereof are transferred from smartphone 10 to the respective smartphone 20 and 30. In other words, smartphones 20 and 30 will benefit from the network adjustment performed in smartphone 10, as their position may be improved at the same time.

It should be noted here that instead of or in addition to smartphone 190 which is treated as a static communications device, one or more stationary communications devices may be installed having fixed position coordinates associated thereto, whose static position coordinates may be used by smartphone 10 in performing the network adjustment, when needed, as stochastically defined coordinates or coordinates defined under constraint with a standard deviation of zero for defining the coordinate system and as observed unknowns.

A positive effect of performing a network adjustment in smartphone 10 can be illustrated referring to FIG. 5. A dashed error ellipse is drawn around each of smartphones 10 to 30, which indicates the current uncertainty range within which each smartphones may be located. Assuming, that at the same time smartphone 190 has already determined its error-free position. The error ellipses may be calculated in conventional manner. For example, error ellipse 110 around smartphone 10 reflects the current accuracy of the GPS receiver 15 in combination with sensor 9. The same applies to error ellipse 80 drawn around smartphone 20, and to error ellipse 92 drawn around smartphone 30.

Once the network adjustment has been performed in smartphone 10 under constraint only for the coordinates of smartphone 190, the position of smartphones 10 to 30 may have improved. This result is illustrated by the solid lines of error ellipse 112 around smartphone 10, error ellipse 82 around smartphone 20, and error ellipse 92 around smartphone 30. Error ellipse 112 around smartphone 10 shows that after the network adjustment has been performed in particular the accuracy of the x coordinate has improved.

If, after execution of the network adjustment the microprocessor 18 of smartphone 10 recognizes, for example, that the position coordinates relating to smartphone 10 as determined by the network adjustment and the accuracy thereof are not better than the data provided by GPS receiver 15 and sensor 9, microprocessor 18 may restart the program to improve the positioning of smartphone 10.

Depending on the implementation and/or the current network state, smartphone 10 may again perform the same procedure described above. This means that a) smartphones 20 to 30 are requested to determine their position coordinates and the accuracy thereof at a new validity time, and to transfer these data as position information to smartphone 10;

b) smartphone 10 measures distances 50, 70, and 130 on its own and requests smartphone 20 to measure distance 60 and to transmit the corresponding observation values to smartphone 10; and that c) under control of microprocessor 18, the optimization algorithm based on a network adjustment is performed for determining the position coordinates, the accuracy thereof and the validity time for smartphone 10 and, optionally, those for smartphones 20 to 40, and the position coordinates of smartphone 190 are again used under constraint, if they still have the same superior accuracy as in the previous network adjustment.

However, it is also conceivable in the re-execution of the optimization algorithm based on a network adjustment to take into account the position coordinates received and their accuracy relating to other mobile communications devices, and optionally further observation values. It is furthermore conceivable that some of the smartphones 20, 30, and 190 and some of the distances 50, 60, 70, and 130 are no longer taken into account. In other words, smartphone 10 together with other mobile communications devices forms a new group within communication network 150, which may likewise be considered as a temporarily stable geometric position network for which a network adjustment can be applied. Smartphone 10 may cause the optimization algorithm to be repeated until the position coordinates of smartphone 10 have been improved sufficiently. It is also conceivable, however, that for example the distance measurements are simultaneously performed by the two partner stations, or that additionally other types of observations between smartphones are used, such as directions or angles.

Smartphone 190 as shown in FIG. 5 may be similar to smartphone 10 shown in FIG. 1 in terms of its configuration and operation.

Figure 6:
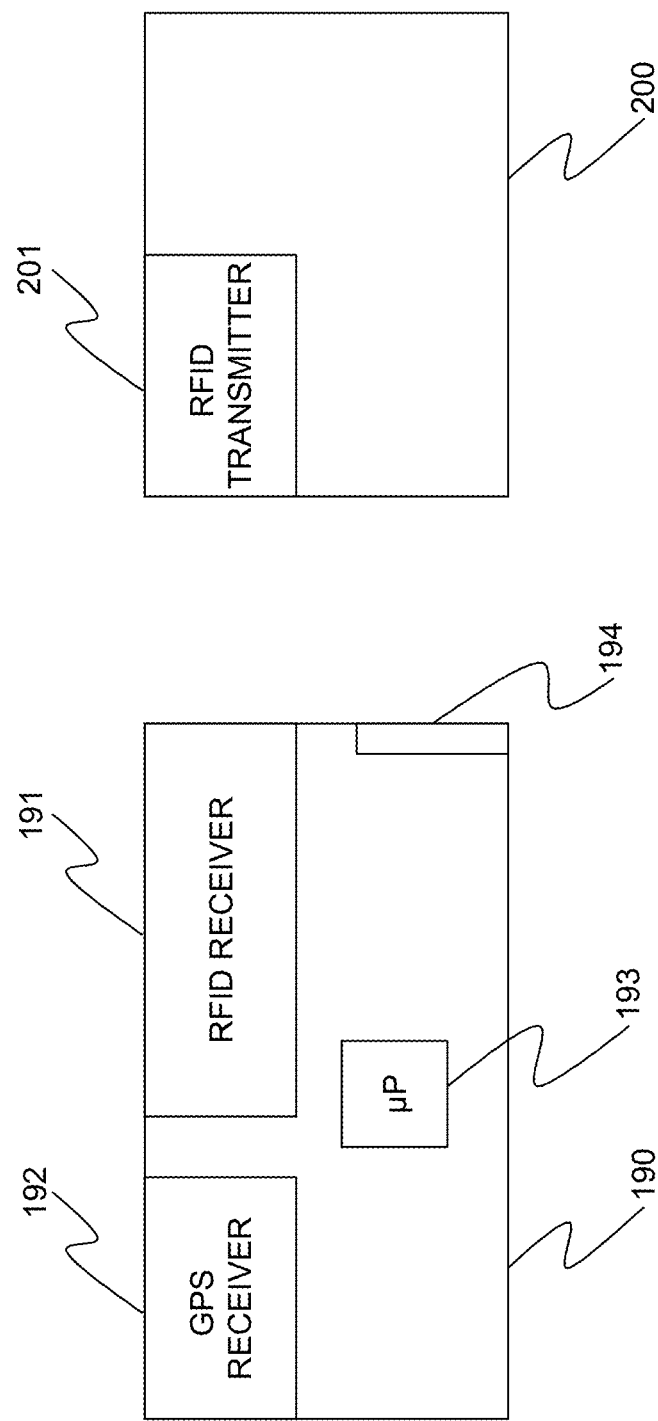
FIG. 6 shows a mobile communications device and a static communications device which use near-field communication.

In FIG. 6, smartphone 190 is illustrated only schematically as having a GPS receiver 192 and a microprocessor 193, although it may correspond to smartphone 10 shown in FIG. 1 in terms of its configuration and functionality. Additionally, smartphone 190 comprises a near field communications device 191 which includes an NFC RFID (Near Field Communication Radio Frequency Identification) receiver, for example. Smartphones 10 and 40 shown in FIGS. 3 to 5 may likewise comprise such an NFC communications device. FIG. 6 further shows a wireless communications device 200 including an NFC RFID transmitter 201, which may be mounted at a fixed location on a pedestal, for example. It will now be explained by way of example, how smartphone 190 has obtained its precise position coordinates which it presented for use in communication network 150.

Assuming that the standardized NFC communications protocol is enabled in smartphone 190. When smartphone 190 now enters the reception range of device 200, it will receive the signal transmitted by NFC RFID transmitter 201. Since when using the near field communications protocol it is assumed that the range of transmitter 201 is 0.04 m, for example, microprocessor 193 of smartphone 190 may adopt this range as a observation value which defines the distance between smartphone 190 and device 200, and may evaluate the accuracy of the length of the range to be 0.03 m, for example. In addition, communications device 200 transmits its error-free position coordinates to smartphone 190. Smartphone 190 stores these position coordinates of communications device 200 with a position accuracy of 0.05 m (=square root of (0.04*0.04+0.03*0.03). This position information will be provided by smartphone 190 in FIG. 5 to smartphone 10, for the network adjustment, as coordinates that are deliberately assumed as error-free, since they are of superior accuracy when compared to all other values.

Figure 7:
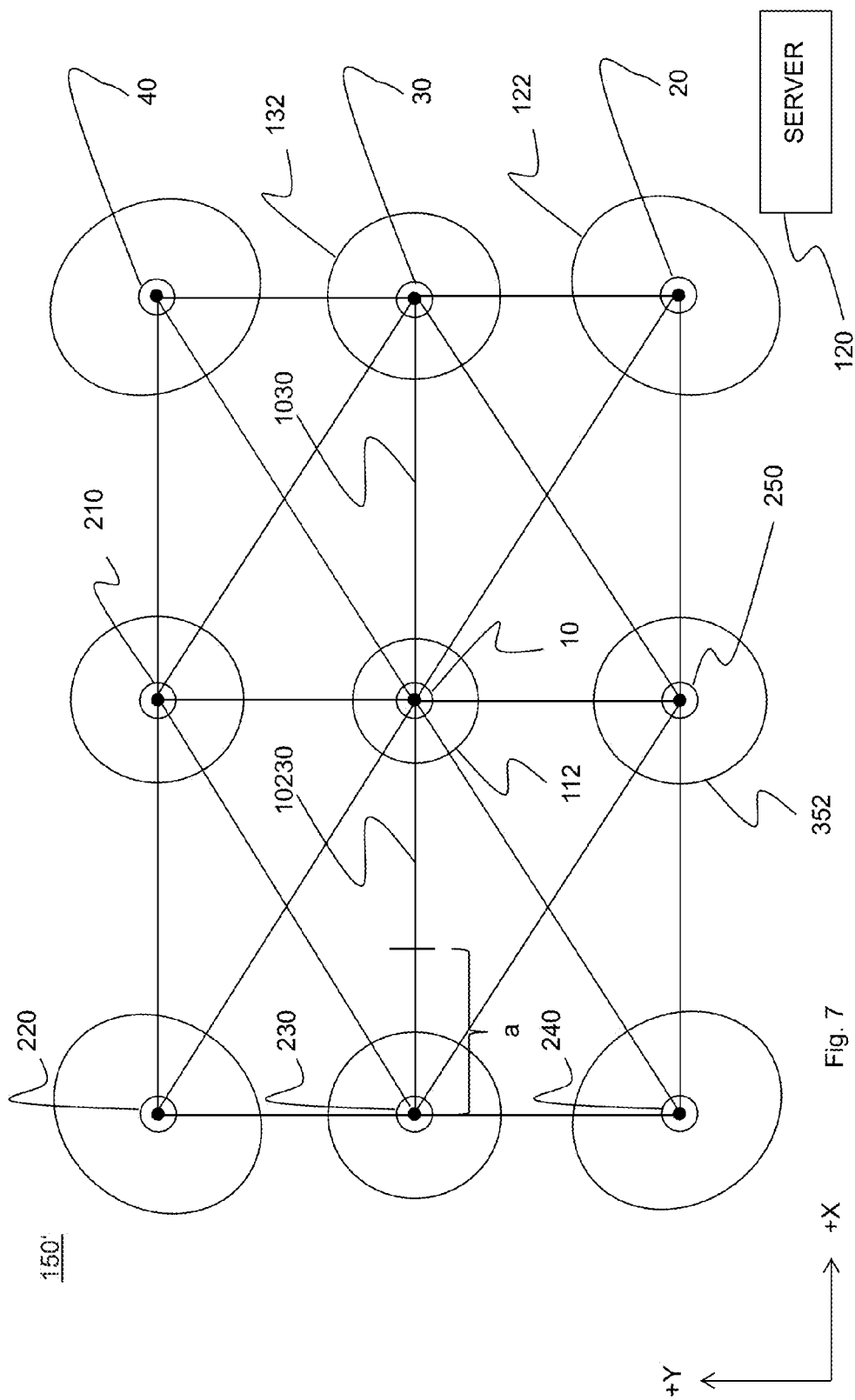
FIG. 7 shows another alternative wireless communication network with nine mobile communications devices.

Another example is illustrated in FIG. 7, which relates to network adjustment in a free network, which is defined in this case by the Gauss-Markov model with specific restrictions, for example, so that the trace of the variance-covariance matrix of the unknown coordinates, i.e. the sum of the variances of all coordinates, is minimized FIG. 7 illustrates a wireless communication network 150' including smartphones 10 to 40, and 210 to 250. All smartphones are assumed to be of the type of mobile telephone 10 according to FIG. 1. Assuming, that initially either the position of all smartphones is not known at all, or that positionings are so inaccurate that in comparison to the accuracy 'a' of distance measurement as indicated the positionings provided by the respective GPS receivers 15 and sensors 9 are assessed to be so poor that they should not be used for stochastic definition of the coordinate system.

The coordinates of all smartphones are only determined on the basis of distance measurements of the same accuracy between the smartphones and based on free network adjustment, wherein the calculation coordinate system is defined by parameter transformation of the unknown coordinates to their approximate values and is changing during the iterative process of parameter estimation, since the approximate values are changing. This is because a subsequent iteration always uses the coordinate unknowns most recently estimated as the new approximate values. This parameter transformation technique in the free network is known to a person skilled in geodesy. The free network adjustment does not affect the strict statistical outlier tests for grossly wrong observations.

The coordinate system in which the coordinates and their accuracies are in the point of convergence of the approximation of this free network adjustment is therefore determined by the initial approximate values of the coordinate unknowns of the positions of all smartphones involved. The coordinates determined by this network adjustment and the accuracy thereof may be strictly transformed by similarity transformations into a different target coordinate system, in a post-processing step.

Assuming that in the present case only the short distances between immediately adjacent smartphones were determined by distance measurements based on signal strengths using sensor 17. This is to say that along long connection lines such as from smartphone 230 to smartphone 30 only distance 10230 between smartphones 230 and 10 and distance 1030 between smartphones 10 and 30 were measured, but the distance between smartphones 230 and 30 was not separately measured. Thus, 20 independent distance measurements have been provided in total, all of which are of the same accuracy 'a'. On the path from smartphone 10 to 230, the amount of 'a' has been indicated by way of example. The error ellipses of the positions of the smartphones resulting from this free network adjustment are illustrated as solid line ellipses in FIG. 7, e.g. error ellipse 112 for smartphone 10, and error ellipse 122 for smartphone 20.

The scenario shown in FIG. 7 may for example exist when smartphone 10 or a plurality of smartphones at the same time, e.g. smartphones 10, 30, 210, and 230, want to determine their positional relationship to other ones of the smartphones involved but a GPS-based determination is not possible and the information from the respective motion sensor 9 is extremely inaccurate. For the positional relationship to another one of the smartphones involved in the free network adjustment, the definition of the common coordinate system as a coordinate system that is defined absolutely in the space is not important. What is important here is that the coordinate system is placed in a manner so that it is stably positioned and provides the smallest possible error ellipses for the specific particular smartphones, here 10, 30, 210, and 230, as a result of network adjustment, so that one of these specific smartphones involved is capable to arrive at another one of these specific smartphones through relative navigation specifications with respect to this coordinate system. The parameter transformation may take this into account and may accordingly include only specific coordinates in the parameter transformation which is decided at the beginning of the optimization algorithm. In FIG. 7 parameter transformation was performed for all coordinates.

If, for example, the free network adjustment is performed in smartphone 10 and its microprocessor 18, the microprocessor may start a pre-processing to obtain or calculate suitable approximate values for the coordinates of the smartphones to be involved in the parameter transformation, in order to obtain a plausible coordinate system in absolute terms as the calculation coordinate system. For this purpose the microprocessor will need initial approximate coordinates and, where possible, additional measurements.

This type of network adjustment may even be employed when one or more of the mobile smartphones of the present example are permanently fixed communications devices with supposedly high positional accuracy, but this information is not trusted and only the positional relationship to other mobile communications devices is of interest. In the network adjustment, all approximate coordinates to which parameter transformation is performed will be provided with corrections for the coordinates and re-calculated accuracies.

Some aspects will again be summarized below, wherein the reference numerals used are only given for the sake of better legibility and do not limit the subject matter of the invention.

According to one aspect, a method for determining the position of at least one mobile communications device of a wireless communication network can be provided, which may comprise the steps of:

determining at least one observation value which defines the positional relationship between a first, mobile communications device 10 or 190 and a second communications device 20 or 200;

providing a position information which defines the position of the second communications device 20 or 200, wherein the position information includes information about the position coordinates and the accuracy thereof;

determining the position coordinates of the first, mobile communications device 10 or 190, and the accuracy of the position coordinates based on the observation value and the position information of the second communications device 20 or 200.

The term "determining a position" is intended to include the cases in which a position is initially determined or a current positioning is improved. By using observation values, i.e. geometrical relationships of mobile communications devices, and by using position information of the second communications device, the position of the first, mobile communications device can be determined even if the first, mobile communications device does not comprise its own GNSS enabled receiver and does not comprise a motion sensor.

According to a further aspect, a method for determining the position of at least one mobile communications device 10 of a wireless communication network is provided, comprising the steps of:

a1) determining a observation value which defines the positional relationship between a first, mobile communications device, 10 or 190, and a second communications device, 20 or 200;

a2) determining a further observation value which defines the positional relationship between the first, mobile communications device 10 and at least one further communications device 30, 40, 210 to 250; and/or determining a further observation value which defines the positional relationship between the second communications device 20 and the at least one further communications device 30 or 40;

b) providing a position information which defines the position of the second communications device 20 or 200, which position information includes information about the position coordinates and the accuracy thereof; and providing a position information for the at least one further communications device 30, 40, which position information defines the position of the at least one further communications device 30, 40, the position information including information about the position coordinates and the accuracy thereof;

c) executing an optimization algorithm for estimating the position coordinates of the first, mobile communications device and the accuracy of the position coordinates based on the observation value, the at least one further observation value, the position information of the second communications device 20, and the position information of the at least one further communications device 30, 40, wherein the optimization algorithm is based on a network adjustment;

wherein the first, mobile communications device 10, the second communications device 20, and the at least one further communications device 30, 40 define a temporarily stable geometric position network, and wherein, if needed, the positions of each of the communications devices 20 to 40 may also be determined in the adjustment.

The term "temporarily stable geometric position network" preferably means that the position coordinates of the communications devices involved, which define the position points of the position network, the observation values and, optionally, the accuracies thereof, which are used as parameters in the network adjustment are determined or measured at essentially a single predetermined validity time, or at least have been corrected sufficiently exactly to this time.

Further, the term "temporarily" preferably means that the communications devices involved can be considered as position points of a geometric network at least during the measurement times of the observation and input parameters for executing the network adjustment for calculating the position of the mobile communications device.

For example, a "temporarily stable geometric position network" is given whenever all parameters are valid at substantially the same time, although individual communications devices are mobile.

The position of a communications device is preferably defined by the position coordinates and the accuracy thereof. The accuracy in turn is preferably defined by the standard deviation.

The first, mobile communications device 10, the second communications device 20 and at least one further communications device 30 and/or 40 temporarily form a group which may be considered as kind of an ad-hoc network.

If at least the second communications device 20 is a mobile communications device, the optimization algorithm may be based on a network adjustment which, if needed, additionally recalculates the position of the second mobile communications device.

According to another aspect of the invention, preferably step a) determines the observation value which defines the positional relationship between a first, mobile communications device 10 or 190 and a second communications device 20 or 200, and the one further observation value which defines the positional relationship between the first, mobile communications device 10 and the at least one further communications device 30, 40. In addition, the second communications device 20 and the at least one further communications device 30, 40 are treated as partially or completely static communications devices defined under constraint with respect to at least one coordinate direction, so that a coordinate system rigid in at least this single coordinate is defined under constraint. The optimization algorithm is then based on a geometric network adjustment using the coordinate system defined under constraint in at least the one coordinate.

The term "static communications device" preferably comprises stationary communications devices or mobile communications devices that may temporarily be treated as a static communications device, that means which are usually known with such a high accuracy in at least one of their coordinates, that in the adjustment process the standard deviation of that at least one coordinate can sufficiently precisely be set to zero.

According to a further aspect of the invention, preferably
in step a) observation values may be determined, which indicate the positional relationship between a first, mobile communications device 10 or 190 and at least two other communications devices among 20 to 40 and 210 to 250;
in step b) none or some of the coordinates of some or none of communications devices 190, 10 to 40, and 210 to 250 and their accuracies may be determined and transmitted to communications device 10 or 190;
in step c) a free network adjustment may be performed in communications device 10 or 190, as an optimization algorithm that determines the coordinates and their accuracy of those coordinates that have been defined as improvable unknowns in the free network adjustment, wherein in the network adjustment all or only some of the coordinate system defining positions are determined without constraint and without stochastic definition, and, if desired, the respective positions and accuracies as determined may be transferred to any involved communications device, and, appropriately, communications device 10 or 190 decides how the calculation coordinate system of the free network adjustment is defined.

Suitably, the at least one observation value determined in step a) is made available in the first, mobile communications device 10 or 190.

Step b) comprises transmitting position information which define the position of the second communications device 20 or 200 from the second communications device 20 or 200 to the first, mobile communications device 10 or 190; and step c) is performed in the first, mobile communications device 10 or 190.

Alternatively, the at least one observation value determined in step a) is made available in a central device 120; wherein
step b) comprises transmitting the position information defining the position of the second communications device 20 from the second communications device to the central device 120; and
step c) is performed in the central device 120, wherein the position coordinates determined in step c) and the accuracy thereof are transmitted to the first, mobile communications device 10 and, if needed, also to the other communications devices.

Advantageously, step a) may comprise measuring at least one measurement parameter for determining the at least one first observation value, wherein the at least one first observation value includes information about the spatial distance and/or the angle and/or the horizontal direction and/or the vertical angle between the first, mobile communications device 10 and the second communications device 20, wherein the at least one measurement parameter may be measured in the first, mobile communications device 10 and/or in the second communications device 20 or in a further communications device 30, 40, 190.

Appropriately, each observation value has associated therewith a validity time, and each position information includes a validity time, wherein step c) determines the position coordinates, the accuracy thereof, and the corresponding validity time for the first, mobile communications device 10.

Advantageously, step c) further comprises determining the position coordinates and the accuracy of the position coordinates of the second communications device 20, and/or, if the at least one further communications device 30, 40 is a communications device whose position coordinates have been assumed to be exactly known without constraint the position coordinates and the accuracy of the position coordinates thereof are also determined by the network adjustment, wherein the respective position coordinates and the accuracy thereof are transmitted to the second communications device 20 and/or to the at least one further communications device 30, 40, and wherein the second communications device 20 and/or the at least one further communications device 30, 40, may adopt the respective position determined by the network adjustment as the current position.

Advantageously, step c) may further comprise determining the validity time of the respective position coordinates, and/or step c) may be perform in response to a request command of the second communications device 20 and/or of the at least one further communications device 30, 40, and/or of the central device 120.

Advantageously, in the first, mobile communications device 10, a position information is determined by executing a position determining program which is based on a positioning method, in particular a GNSS-based or a WLAN-based positioning method, and/or based on a motion sensor, wherein the position information includes information about the position coordinates of the first, mobile communications device 10 and the accuracy of the position coordinates, and wherein in step c) the position information of the first, mobile communications device 10 is also processed in the network adjustment.

Advantageously, at least the first, mobile communications device 10 stores different optimization algorithms for estimating the position coordinates and the accuracy thereof, and an optimization algorithm that is to be executed is selected in response to a predetermined condition.

Advantageously, the first, mobile communications device 10, the second communications device 20, and the at least one further communications device 30, 40 are selected based on predefineable criteria, and/or the position information is determined in the second communications device 20 and/or in the at least one further communications device 30, 40 by performing a position determining program which is based on a positioning method, in particular a GNSS-based or WLAN-based positioning method, and/or using a motion sensor.

Appropriately, the execution of steps a) and/or b) and/or c) is performed under control of the first, mobile communications device 10 or of the central device 120, and/or the position information of the second communications device 200 is transmitted from the second communications device 200 to the first, mobile communications device 190 using a near field communication protocol, wherein the observation value is defined by the near field communication protocol being used.

The position information and/or the observation values and/or the validity times may be exchanged between the communications devices using a communication protocol for wireless data transmission, in particular the standardized Wi-Fi Direct protocol.

According to another aspect, a mobile wireless communications device 10 is provided for use in a wireless communications network 5, 5', 150, 150', which comprises a wireless data communication interface 14, wherein the wireless data communication interface 14 is adapted for receiving at least one position information that defines the position of another communications device 20, 30, 40, 190, 210-250, the position information including information about the position coordinates and the accuracy thereof. Further, a memory 11 is provided for storing at least one observation value which defines the positional relationship between two communications devices 10, 20, 30, 40, 190, 210-250, and a programmable control unit 18 which is adapted to determine the position coordinates of the mobile wireless communications device 10 and the accuracy of the position coordinates based on the at least one observation value and the at least one position information of the other communications device 20, 30, 40, 190, 210-250.

The programmable control unit 18 is further adapted to perform at least one optimization algorithm for estimating the position coordinates of the mobile wireless communications device 10 and the accuracy of the position coordinates based on the position information of at least two other communications devices 20, 30, 40, 190, 210-250, at least two observation values, and optionally based on the position information of the mobile wireless communications device 10; and wherein the at least one optimization algorithm is based on a network adjustment under constraint and/or on a stochastically defined coordinate system and/or on a free network adjustment.

The mobile wireless communications device may advantageously comprise at least one measuring unit 17 for measuring a measurement parameter, and an evaluation unit 16 adapted to determine a observation value based on the measured measurement parameter which defines the positional relationship between two communications devices 190, 10-40, 210-250. Additionally or alternatively, the mobile wireless communications device 10 may comprise a GNSS compatible receiver 15 adapted to receive position signals for determining therefrom a position information which includes the position coordinates of the mobile wireless communications device and the accuracy of the position coordinates. The mobile communications device 10 may, additionally or alternatively, comprise a motion sensor 9 which can detect signals for determining relative movements for determining therefrom a position information which includes position coordinates of the mobile wireless communications device and the accuracy of the position coordinates.

The programmable control unit 18 may advantageously be adapted to determine the position coordinates of the at least two other communications devices 20, 30, 40, 190, 210-250, and the accuracy of each of these position coordinates, and the wireless data communication interface 14 may be adapted to transmit the position coordinates and the accuracy thereof to the respective other communications device.

Suitably, the control unit 18 and/or 121 will be adapted to repeatedly perform the optimization algorithm and to subsequently perform a block adjustment.

Suitably, the control unit 18 and/or 121 will be adapted to perform an algorithm and subsequently a similarity transformation of the results of a network adjustment into another coordinate system, wherein coordinates and their accuracy may be strictly transformed.

Advantageously, each observation value may have associated therewith a validity time, and the position information may include a respective validity time, wherein the control unit 18 may be adapted to determine the position coordinates of the mobile wireless communications device 10 and, optionally, the position coordinates of the at least two other communications devices 20, 30, 40, 190, 210-250, and the respective accuracy of the position coordinates and a validity time.

According to another aspect, a central wireless communications device 120 for determining the position of at least one mobile wireless communications device is provided, which comprises a wireless data communication interface 122 adapted to receive position information from at least two other communications devices 10-40, 190, wherein the position information defines the respective position of the at least one other communications device 10-40, 190, 210-250, and includes information about the position coordinates and the accuracy thereof, and which is further adapted to receive observation values, each of which defines the positional relationship between two communications devices. Further, the central communications device 120 comprises a programmable control unit 121 which is adapted to perform at least one optimization algorithm to estimate the position coordinates of the mobile wireless communications device 10 and the accuracy of the position coordinates based on the position information of the at least two other communications devices 20, 30, of at least two observation values, and, optionally, based on the position information of the mobile wireless communications device 10, wherein the at least one optimization algorithm is based on a network adjustment under constraint and/or a stochastically defined coordinate system, or on a free network adjustment, and wherein the wireless data communication interface 122 is adapted to transmit the position coordinates and the accuracy thereof to the mobile wireless communications device 10.

The programmable control unit 121 may be adapted to determine the position coordinates of the at least two other communications devices 20, 30 and the accuracy of the respective position coordinates, wherein the wireless communications interface 122 may be adapted to transmit the position coordinates and the accuracy thereof to the respective other of the communications devices 20, 30. Additionally or alternatively, the programmable control unit 121 may be adapted to repeatedly perform the at least one optimization algorithm, and to subsequently perform a block adjustment. Additionally, the programmable control unit 121 may be adapted to subsequently perform an algorithm for transforming the results of the network adjustment into another target coordinate system, wherein the coordinates and their accuracy may be strictly transformed.

Each observation value may have associated therewith a validity time, and the position information may include a respective validity time, wherein the programmable control unit 121 may be adapted to determine the position coordinates of the mobile wireless communications device 10 and, optionally, the position coordinates of the at least two other communications devices 20, 30, and the respective accuracy of the position coordinates, and a validity time.

According to another aspect, a computer program is provided which comprises a plurality of instructions which are storable in a plurality of wireless communications devices 10-40, 120, 190, 210-250, at least one of which is configured as a wireless mobile communications device 10-40, 210-250, wherein the instructions, when being read and processed by a microprocessor 18 of the at least one mobile communications device 10 and by the microprocessor of another one of the wireless communications devices 20-40, 120, 190, 210-250, perform the method described above, thereby allowing a system of wireless communications devices 10-40, 190, 210-250, by way of this implemented computer program, to improve their position coordinates and the accuracy thereof when compared to previously known methods, and to represent them in the predefined target coordinate systems or in any pure calculation coordinate systems, and to perform this automatically and without manual inputs.

According to another aspect, even the hitherto at least one mobile communications device 10 may be a fixedly mounted static communications device whose coordinates may nevertheless be treated in the network adjustment like a mobile communications device whose coordinates are to be determined initially or are to be improved.

What is necessary is a precise synchronization of all the measurements, i.e. the measurements of the positions and of the positional relationship between two communications devices. For this purpose, the communications devices involved may agree on a validity time in the future. Alternatively, if a number of position information and observation values are already available from different times, an appropriate validity time may be computed by interpolation or extrapolation, in a conventional manner. Measures for synchronizing the measurement and for performing interpolation or extrapolation are not subject of the invention.

The network adjustment based on a coordinate system predefined under constraint and/or stochastically, or the free network adjustment may be based on the method of least squares.

The optimization algorithm that performs a network adjustment may be based on a functional and statistical model, in particular a Gauss-Markov model, or a heuristic model.

Besides the Gauss-Markov model, other models may also be used for the network adjustment.

The programmable control unit may be adapted for repeatedly executing the optimization algorithm and for subsequently executing a block adjustment, and/or may be adapted for transformation of the network adjustment results into another predefined target coordinate system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for determining the position of a mobile communications device of a wireless communication network, the method comprising the steps of:

a1) determining, by a processor, an observational value which defines the positional relationship between a first mobile communications device and a second communications device;

a2) determining, by the processor, a further observational value which defines the positional relationship between the first mobile communications device and a further communications device;

b) providing a position information for the second communications device which defines the position of the second communications device which includes information on position coordinates and the accuracy thereof, and providing a position information for the further communications device Which defines the position of the further communications device and which includes information on position coordinates and the accuracy thereof; and c) executing, by the processor, an optimization algorithm for estimating the position coordinates of the first mobile communications device and the accuracy of the position coordinates based on the observational value, the further observational value, the position information of the second communications device, and the position information of the further communications device, wherein said optimization algorithm is based on a network adjustment;

wherein the first mobile communications device and second and further communications devices define a temporary geometric position network.

2. The method according to claim 1, wherein the second communications device is a mobile communications device and wherein the optimization algorithm is based on a free network adjustment.

3. The method according to claim 1, wherein during execution of the optimization algorithm the second communications device and the further communications device are treated as communications devices of exactly known position or stochastically known position with respect to at least one coordinate, so that a coordinate system is defined that is exactly known or stochastically known based on the at least one coordinate; and wherein the optimization algorithm is based on a geometric network adjustment using the coordinate system exactly known or stochastically known with respect to a direction corresponding to the at least one coordinate.

4. The method according to claim 1, wherein the observational value determined in step a) is made available in the first mobile communications device;

wherein step b) further comprises transmitting the position information defining the position of the second communications device from the second communications device (20) to the first mobile communications device; and wherein step c) is performed in the first mobile communications device; or wherein the observational value determined in step a) is made available in a central device;

wherein step b) comprises transmitting the position information defining the position of the second communications device from the second communications device to the central device; and wherein step c) is performed in the central device;

wherein the position coordinates determined in step c) and the accuracy thereof are transmitted to the first mobile communications device.

5. The method according to claim 1, wherein step a) comprises measuring at least one measurement parameter for determining the observational value; and wherein the observational value includes information about the spatial distance and/or the angle and/or the horizontal direction and/or the vertical angle between the first mobile communications device and the second communications device;

wherein the at least one measurement parameter can be measured in the first mobile communications device and/or in the second communications device or in a further communications device.

6. The method according to claim 1, wherein each observational value has associated therewith a validity time, and each position information includes a validity time; and wherein in step c) the position coordinates, the accuracy thereof, and the corresponding validity time are determined for the first mobile communications device.

7. The method according to claim 1, wherein step c) further comprises determining the position coordinates and the accuracy of the position coordinates of the second communications device and/or, if the at least one further communications device is a static communications device whose position coordinates have not been exactly determined, or if it is a mobile communications device, the position coordinates and the accuracy of the position coordinates thereof are also determined by the network adjustment;

wherein the respective position coordinates and the accuracy thereof are transmitted to the second communications device and/or to the further communications device; and wherein the second communications device and/or the further communications device is capable to adopt the respective position as determined by the network adjustment as the current position.

8. The method according to claim 1, wherein step c) further comprises determining the validity time of the respective position coordinates; and/or wherein step c) is performed in response to a request command of the second communications device and/or of the further communications device and/or of the central device (120).

9. The method according to claim 1, wherein in the first mobile communications device a position information is determined by executing a position determining program which is based on a positioning method, in particular a GNSS-based or WLAN-based positioning method, wherein the position information includes information about the position coordinates of the first mobile communications device and the accuracy of the position coordinates; and wherein in step c) said position information of the first, mobile communications device is also processed in the network adjustment.

10. The method according to claim 1, wherein the first mobile communications device stores different optimization algorithms for estimating position coordinates and the accuracy thereof; and wherein an optimization algorithm to be executed is selected in response to a predetermined condition.

11. The method according to claim 1, wherein the first mobile communications device, the second communications device and the further communications device are selected based on predefineable criteria; and/or wherein the position information is determined in the second communications device and/or in the further communications device by performing a position determining program which is based on a GNSS-based or WLAN-based positioning method.

12. The method according to claim 1, wherein the execution of steps a) and/or b) and/or c) is performed under control of the first mobile communications device or the central device; and/or wherein the position information of the second communications device is transmitted from the second communications device to the first, mobile communications device using a near field communication protocol; and wherein the observational value is defined by the near field communication protocol being employed.

13. The method according to claim 1, wherein the position information and/or the observational values and/or the validity times can be exchanged between the communications devices using a standardized Wi Fi Direct protocol.

14. A mobile wireless communications device for use in a wireless communication network, comprising:

a wireless data communication interface, wherein the wireless data communication interface is adapted for receiving position information that defines the position of at least one other communications device which includes information about position coordinates and the accuracy thereof;

a memory for storing an observational value which defines the positional relationship between two of the communications devices; and a programmable control unit adapted to determine the position coordinates of the mobile wireless communications device and the accuracy of the position coordinates based on the observational value and the position information of the at least one other communications device;

wherein the at least one other communications device includes two communications devices and wherein the programmable control unit is adapted to perform an optimization algorithm for estimating the position coordinates of the mobile wireless communications device and the accuracy of the position coordinates based on the position information of the at least two other communications devices and at least two observational values; and wherein the optimization algorithm is based on a free network adjustment or on a geometric network adjustment using a coordinate system that is defined by at least one coordinate and/or one coordinate direction under constraint, and/or a stochastically defined coordinate system.

15. The mobile wireless communications device of claim 14, further comprising:

a measuring unit for measuring a measurement parameter; and an evaluation unit adapted to determine an observation value based on the measured measurement parameter, which defines the positional relationship between two of the communications devices; and/or a GNSS compatible receiver adapted to receive position signals for determining therefrom a position information which includes the position coordinates of the mobile wireless communications device and the accuracy of the position coordinates.

16. The mobile wireless communications device of claim 14, wherein the programmable control unit is adapted to determine the position coordinates of the at least two other communications devices and the accuracy of the respective position coordinates; and wherein the wireless data communication interface is adapted to transmit the position coordinates and the accuracy thereof to the respective other communications devices.

17. The mobile wireless communications device of claim 14, wherein the programmable control unit is adapted to repeatedly perform the optimization algorithm and to subsequently perform a block adjustment, and/or for similarity transformation of the position information of the adjusted network into another target coordinate system.

18. The mobile wireless communications device of claim 14, wherein each observation value has associated therewith a validity time, and the position information include a respective validity time;
wherein the programmable control unit is adapted to determine the position coordinates of the mobile wireless communications device.

19. A central wireless communications device for determining the position of a mobile wireless communications device, comprising:
a wireless data communication interface adapted to receive position information from at least two other communications devices, each position information defining the position of the each of the at least two other communications devices and including information about position coordinates and the accuracy thereof, and which is further adapted to receive observation values, each of which defines the positional relationship between two of the communications devices; and
a programmable control unit, adapted to perform an optimization algorithm for estimating the position coordinates of the mobile wireless communications device and the accuracy of the position coordinates based on the position information of the at least two other communications devices and at least two observation values;
wherein the optimization algorithm is based on a free network adjustment or on a geometric network adjustment using a coordinate system which is defined by at least one coordinate and/or one coordinate direction under constraint and/or, a stochastically defined coordinate system;
wherein the wireless data communication interface is adapted to transmit the position coordinates and the accuracy thereof to the mobile wireless communications device.

20. The central wireless communications device according to claim 19, wherein the programmable control unit is adapted to determine the position coordinates of the at least two other communications devices and the accuracy of the respective position coordinates; and
wherein the wireless data communication interface is adapted to transmit the position coordinates and the accuracy thereof to the respective other communications device; and/or wherein the programmable control unit is adapted to repeatedly perform the optimization algorithm, and to subsequent perform a block adjustment and/or a similarity transformation of the position information into another coordinate system.

21. The central wireless communications device according to claim 19, wherein each observation value has associated therewith a validity time, and the position information includes a respective validity time;
wherein the programmable control unit is adapted to determine the position coordinates of the mobile wireless communications device.

22. A non-transitory processor-readable medium having processor-executable instructions stored thereon for determining the position of a mobile communications device of a wireless communication network, the processor-executable instructions, when executed by a processor, facilitating performance of the following steps:
a1) determining an observational value which defines the positional relationship between a first mobile communications device and a second communications device;
a2) determining a further observational value which defines the positional relationship between the first mobile communications device and a further communications device;
b) providing a position information for the second communications device which defines the position of the second communications device which includes information on position coordinates and the accuracy thereof, and providing a position information for the further communications device which defines the position of the further communications device and which includes information on position coordinates and the accuracy thereof; and
c) executing an optimization algorithm for estimating the position coordinates of the first mobile communications device and the accuracy of the position coordinates based on the observational value, the further observational value, the position information of the second communications device, and the position information of the further communications device, wherein said optimization algorithm is based on a network adjustment;
wherein the first mobile communications device and second and further communications devices define a temporary geometric position network.

* * * * *